United States Patent
Vaquero-Caballero et al.

(10) Patent No.: US 11,575,556 B2
(45) Date of Patent: Feb. 7, 2023

(54) ESTIMATION OF COMMUNICATION SYSTEM IMPAIRMENTS USING SPECTRALLY SELECTIVE SIGNAL PERTURBATIONS

(71) Applicant: CIENA CORPORATION, Hanover, MD (US)

(72) Inventors: Francisco Javier Vaquero-Caballero, Valladolid (ES); Michael Andrew Reimer, Stittsville (CA); Seb Savory, Ely (GB); Maurice O'Sullivan, Ottawa (CA); Mohammad Ebrahim Mousa Pasandi, Ottawa (CA); David Ives, Royston (GB); Michael Hubbard, Ottawa (CA); Andrew D. Shiner, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/458,915

(22) Filed: Aug. 27, 2021

(65) Prior Publication Data
US 2022/0070044 A1 Mar. 3, 2022

Related U.S. Application Data

(60) Provisional application No. 63/071,478, filed on Aug. 28, 2020.

(51) Int. Cl.
*H04L 27/26* (2006.01)
*H04L 27/36* (2006.01)

(52) U.S. Cl.
CPC ........ *H04L 27/2688* (2013.01); *H04L 27/361* (2013.01)

(58) Field of Classification Search
CPC .......... H04L 27/2688; H04L 27/361
USPC ........................................... 375/262
See application file for complete search history.

(56) References Cited

U.S. PATENT DOCUMENTS 6,671,466 B1 * 12/2003 Banerjee .............. H04B 10/296
398/79
2020/0127740 A1 * 4/2020 Yu ...................... H04B 10/0795

OTHER PUBLICATIONS

Koch, "Random Signal Method of Nonlinear Amplitude Distortion Measurement," IEEE Transactions on Instrumentation and Measurement, Sep. 1973 (Year: 1973).*
Gharaibeh et al., "The Applicability of Noise Power Ratio (NPR) in Real Communication Signals," 67th ARFTG Conference, 2006.
Joshi et al., "A Method for Intermodulation Noise Calculations in a Cable Television Network the HD-MAC, PAL and FM Radio Signals," IEEE Transactions on Broadcasting, Sep. 1992.

(Continued)

*Primary Examiner* — Kevin M Burd
(74) *Attorney, Agent, or Firm* — Clements Bernard Baratta Walker; Christopher L. Bernard; Lawrence A. Baratta, Jr.

(57) ABSTRACT

A communication system is configured to generate a perturbed signal by perturbing an amplitude of a spectrum of an original signal in one or more spectral regions, and to propagate the perturbed signal through components of the communication system. The communication system is further configured to obtain a measurement of the perturbed signal in a first spectral region of the one or more spectral regions following the propagation of the perturbed signal, and to calculate an estimate of an impairment associated with the communication system based on the measurement.

20 Claims, 12 Drawing Sheets

(56) References Cited

OTHER PUBLICATIONS

Koch, "Random Signal Method of Nonlinear Amplitude Distortion Measurement," IEEE Transactions on Instrumentation and Measurement, May 1971.

Kuo, "Noise Loading Analysis of a Memoryless Nonlinearity Characterized by a Taylor Series of Finite Order," IEEE Transactions on Instrumentation and Measurement, Sep. 1973.

Li, "Nonlinear Behavioral Modeling of Quadrature Modulators and Analysis of Impacts on Wireless Communication Systems," dissertation submitted to the Graduate Faculty of North Carolina State University, 2007.

Safi et al., "Back-Off Efficiency Optimization of Traveling-Wave Tubes using Simulated Annealing," IEEE International Vacuum Electronics Conference (IVEC), 2018.

Almonacil, et al. "Measurement of In-band Optical Noise Spectral Density," arXiv EESS (Electrical Engineering and Systems Science), submitted Jul. 9, 2021.

Vaquero-Caballero et al. "In-band Perturbation based OSNR Estimation," arXiv EESS (Electrical Engineering and Systems Science), submitted Oct. 17, 2020; revised Apr. 3, 2021.

Vaquero-Caballero, et al. "Perturbation-based Frequency Domain Linear and Nonlinear Noise Estimation," Journal of Lightwave Technology, submitted May 9, 2021.

Vaquero-Caballero et al. "Transceiver Noise Characterization Based on Perturbations," Journal of Lightwave Technology, vol. 39, No. 18, Sep. 15, 2021.

Chin et al., "Probabilistic Design of Optical Transmission Systems," Journal of Lightwave Technology, vol. 35, No. 4, 2017.

Cho et al., "Convolutional Recurrent Machine Learning for OSNR and Launch Power Estimation: A Critical Assessment," Optical Fiber Communication Conference, 2020.

Dar et al., "Properties of nonlinear noise in long, dispersion-uncompensated fiber links," Optics Express, vol. 21,No. 22, 2013.

Dong Z., et al., "OSNR Monitoring for QPSK and 16-QAM Systems in Presence of Fiber Nonlinearities for Digital Coherent Receivers", Optics Express, 2012, vol. 20, pp. 19520-19534.

Gariepy et al., "Novel OSNR Measurement Techniques for Coherent-Detection Systems," Optical Fiber Communication Conference, 2018.

Ives et al., "A Comparison of Impairment Abstractions by Multiple Users of an Installed Fiber Infrastructure," Optical Fiber Communication Conference, 2019.

Khan et al., "Joint OSNR monitoring and modulation format identification in digital coherent receivers using deep neural networks," Optics Express, vol. 25, No. 15, pp. 17767-17776, 2017.

Lang and Billings, "Output frequencies of nonlinear systems," International Journal of Control, vol. 67, No. 5, pp. 713-730, 1997.

Liu et al., "Machine Learning Based Fiber Nonlinear Noise Monitoring for Subcarrier-multiplexing Systems," Optical Fiber Communication Conference, 2020.

Lonardi et al., "Experimental investigations on power spectral density estimation in heterogeneous dispersion unmanaged transmissions," OSA Continuum, vol. 3, No. 4, 2020.

Poggiolini P., "The GN Model of Non-Linear Propagation in Uncompensated Coherent Optical Systems", Journal of Lightwave Technology, Dec. 15, 2012, vol. 30, No. 24, pp. 3857-3879.

Shiner et al., "Neural Network Training for OSNR Estimation From Prototype to Product,"Optical Fiber Communication Conference, 2020.

Tanimura et al., "Convolutional neural networks for optical performance monitoring," Journal of Optical Communications and Networking, vol. 11, No. 1, 2019.

Tanimura et al., "Deep Learning Based OSNR Monitoring Independent of Modulation Format, Symbol Rate and Chromatic Dispersion," European Conference and Exhibition on Optical Communications, No. 1, pp. 18-20, 2016.

Vaquero-Caballero et al., "Impact of Carrier-Phase Estimation on Noise Transductions for Optical Performance Monitoring," Optical Fiber Communication Conference, No. 1, 2019.

Vaquero-Caballero et al., "Joint Estimation of Linear and Non-linear Signal-to-Noise Ratio based on Neural Networks," Optical Fiber Communication Conference, 2018.

Vaquero-Caballero et al., "Machine Learning Based Linear and Nonlinear Noise Estimation," Journal of Optical Communications and Networking, vol. 10, No. 10, 2018.

Wang et al., "OSNR and nonlinear noise power estimation for optical fiber communication systems using LSTM based deep learning technique," Optics Express, vol. 26, No. 16, p. 21346, 2018.

Xu et al., "Experimental investigation on the nonlinear tolerance of root M-shaped pulse in spectrally efficient coherent transmissions," Optics Express, vol. 23, No. 2, 2015.

\* cited by examiner

ESTIMATION OF COMMUNICATION SYSTEM IMPAIRMENTS USING SPECTRALLY SELECTIVE SIGNAL PERTURBATIONS

TECHNICAL FIELD

This document relates to the technical field of communications.

BACKGROUND

In a communication system, a transmitter may transmit a signal over a communication channel to a receiver, where the signal is representative of digital information in the form of symbols or bits. The receiver may process the signal received over the communication channel to recover estimates of the symbols or bits. Various components of the communication system, including both the transmitter and the receiver, may contribute to signal degradation, such that the signal received at the receiver comprises a degraded version of the signal that was generated at the transmitter. In the case of an optical signal, impairments may be caused by polarization mode dispersion (PMD), polarization dependent loss or gain (PDL or PDG), state of polarization (SOP) rotation, amplified spontaneous emission (ASE), wavelength-dependent dispersion or chromatic dispersion (CD), inter- and intra-channel nonlinear noise, and other effects.

Accurate information about the noise in a communication system may be valuable for a variety of reasons. For example, noise measurements may be used to select the optimal transmission rate for a communication device or to provide an indication of the health of a communication system or network. In general, the ability to maximize the capacity of a communication system may benefit from an accurate understanding of the noise environment in which the communication system is operating.

SUMMARY

In a broad aspect, a communication system comprises circuitry configured to generate a perturbed signal by perturbing an amplitude of a spectrum of an original signal in one or more spectral regions, circuitry configured to propagate the perturbed signal through components of the communication system, circuitry configured to obtain a measurement of the perturbed signal in a first spectral region of the one or more spectral regions following the propagation of the perturbed signal, and circuitry configured to calculate an estimate of an impairment associated with the communication system based on the measurement.

According to some examples, the components comprise components of a transmitter device and components of a spectrum measurement device (SMD) connected directly to the transmitter device, the transmitter device comprising the circuitry configured to generate the perturbed signal, and the SMD comprising the circuitry configured to obtain the measurement, where the amplitude of the spectrum is attenuated to substantially zero over a contiguous set of frequencies defining the first spectral region, where the measurement comprises a measurement of power of the perturbed signal in the first spectral region, and where the impairment comprises a noise floor of the communication system in the first spectral region.

According to some examples, the communication system further comprises circuitry configured to generate additional versions of the perturbed signal, each additional version generated by attenuating the amplitude of the spectrum to substantially zero over a different contiguous set of frequencies defining a different spectral region of the spectrum, circuitry configured to propagate each additional version of the perturbed signal through the components of the communication system at a different time, circuitry configured to obtain an additional version of the measurement for each additional version of the perturbed signal following the propagation of the additional version, and circuitry configured to calculate an additional estimate of the noise floor in each additional spectral region based on each additional version of the measurement.

According to some examples, the amplitude of the spectrum is attenuated to substantially zero over a contiguous set of frequencies defining a second spectral region of the one or more spectral regions, and the communication system further comprises circuitry configured to obtain a measurement of power of the perturbed signal in the second spectral region following the propagation of the perturbed signal, and to calculate an estimate of a noise floor of the communication system in the second spectral region based on the measurement of the perturbed signal in the second spectral region.

According to some examples, the SMD comprises any one of an electrical spectrum analyzer (ESA), an optical spectrum analyzer (OSA), and a coherent receiver.

According to some examples, the communication system comprises circuitry configured to generate the perturbed signal by applying a phase perturbation to the spectrum in a second spectral region that is substantially symmetrically disposed relative to the first spectral region about a central frequency of the spectrum, wherein the phase perturbation comprises a function of frequency, circuitry configured to generate additional versions of the perturbed signal, each additional version generated by applying a different phase perturbation, comprising a different function of frequency, to the spectrum in the second spectral region, and by attenuating the amplitude of the spectrum to substantially zero over the contiguous set of frequencies defining the first spectral region, circuitry configured to propagate each additional version of the perturbed signal through the components of the communication system at a different time, and circuitry configured to obtain an additional version of the measurement in the first spectral region for each additional version of the perturbed signal following the propagation of the additional version of the perturbed signal, wherein the estimate of the impairment is calculated based on the additional versions of the measurement, and wherein the impairment comprises frequency-dependent phase offset.

According to some examples, the components comprise components of a transmitter device, components of a receiver device, and components of at least one communication channel between the transmitter device and the receiver device, the transmitter device comprising the circuitry configured to generate the perturbed signal, and the receiver device comprising the circuitry configured to obtain the measurement, where the amplitude of the spectrum is attenuated to substantially zero over a contiguous set of frequencies defining the first spectral region, where the amplitude is unperturbed over a contiguous set of frequencies defining a second spectral region, and where the amplitude is unperturbed over a contiguous set of frequencies defining a third spectral region. The communication system further comprises circuitry configured to generate additional versions of the perturbed signal, each additional version generated by enhancing the amplitude of the spectrum in the second spectral region and by attenuating the amplitude of the spectrum by a corresponding amount in the third spectral region, where each additional version is characterized by a different pair of amplitudes in the second and third spectral regions, circuitry configured to propagate each additional version of the perturbed signal through the components of the communication system at a different time, circuitry configured to obtain an additional version of the measurement for each additional version of the perturbed signal following the propagation of the additional version, and circuitry configured to calculate the estimate of impairment based on the measurement and the additional versions of the measurement.

According to some examples, the communication system is configured for optical communication and the components of the at least one communication channel comprise a plurality of spans, each span comprising an optical amplifier.

According to some examples, the impairment comprises amplified spontaneous emission (ASE) or intra-channel nonlinear noise or both.

According to some examples, the at least one communication channel comprises first and second wavelength division multiplexing (WDM) channels, where the perturbed signal and each additional version of the perturbed signal are propagated over the first WDM channel, and where the impairment comprises inter-channel nonlinear noise contributed by the second WDM channel to the first WDM channel.

DETAILED DESCRIPTION

Figure 1:
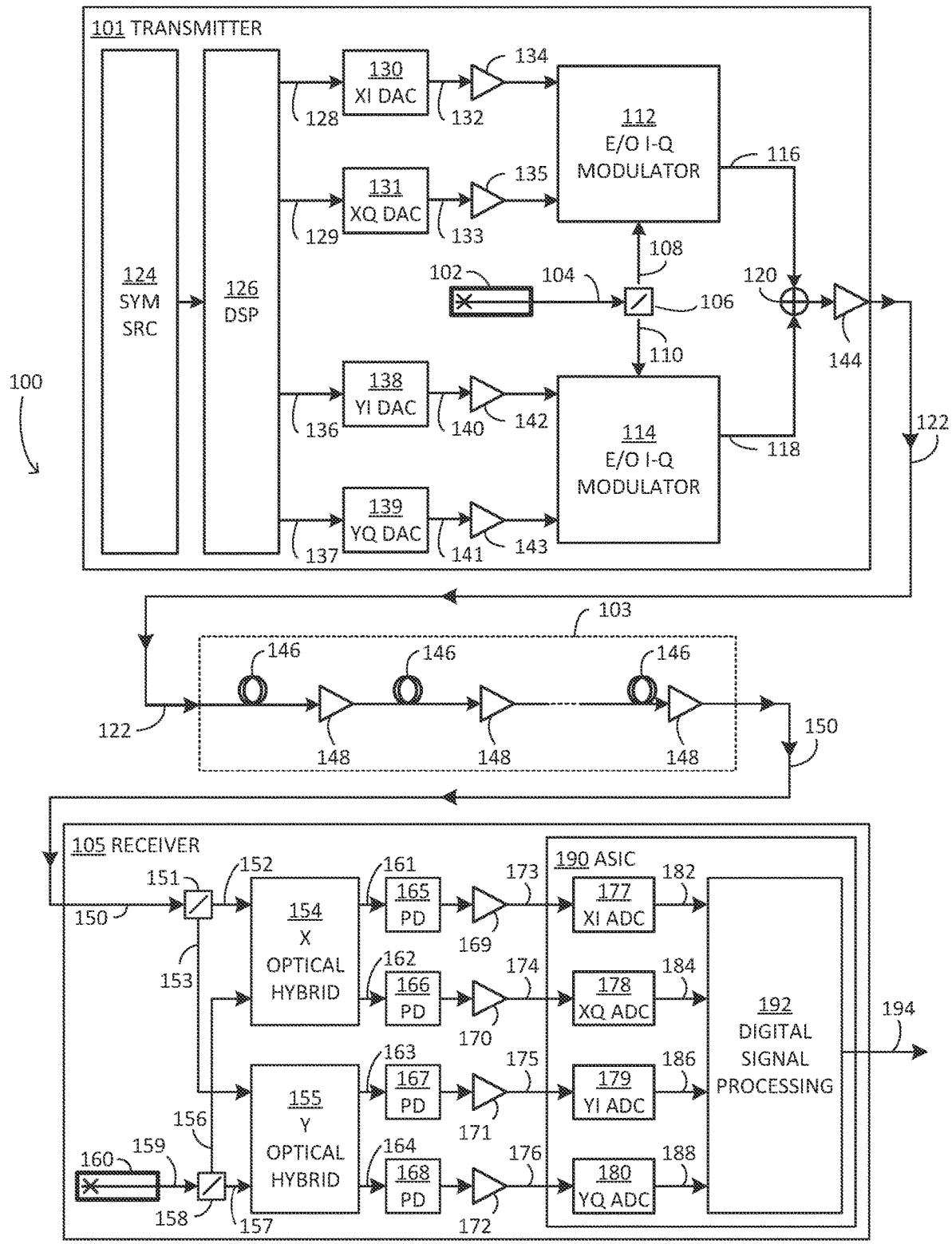
FIG. 1 illustrates an optical communication system in accordance with some examples of the proposed technology.

FIG. 1 illustrates an example optical communication system 100. A transmitter 101 and a receiver 105 are connected via a telecommunications cable (not shown) carrying optical fibers. The cable may be, for example, a submarine cable or a terrestrial cable. One or both of the transmitter 101 and the receiver 105 may comprise a transceiver capable of both transmitting optical signals and receiving optical signals.

The transmitter 101 employs polarization-division multiplexing (PDM). A laser 102 is operative to generate a continuous wave (CW) optical carrier 104. A polarizing beam splitter 106 is operative to split the CW optical carrier 104 into orthogonally-polarized components 108, 110 (nominally referred to as the "X-polarization" component and the "Y-polarization" component) that are modulated by respective electrical-to-optical modulators 112, 114 to produce modulated polarized optical signals 116, 118. The signals 116, 118 are combined by a beam combiner 120, and the resulting combined signal is amplified by an optical amplifier 144 to yield an optical signal 122. According to some examples, the optical amplifier 144 may comprise an erbium-doped fiber amplifier (EDFA).

A symbol source 124 is operative to generate a stream of symbols representing data to be transmitted in the optical signal 122. A digital signal processor (DSP) 126 is operative to process the symbols output from the symbol source 124, for example, performing one or more of pulse shaping, subcarrier multiplexing, chromatic dispersion (CD) pre-compensation, and distortion pre-compensation on the symbols. The DSP 126 is operative to generate I and Q digital drive signals 128, 129 for the X-polarization to be converted by digital-to-analog converters (DACs) 130, 131 into I and Q analog drive signals 132, 133 for the X-polarization that, after amplification by respective amplifiers 134, 135 are used to drive the electrical-to-optical (E/O) modulator 112. The DSP 126 is operative to generate I and Q digital drive signals 136, 137 for the Y-polarization to be converted by DACs 138, 139 into I and Q analog drive signals 140, 141 for the Y-polarization that, after amplification by respective amplifiers 142, 143, are used to drive the E/O modulator 114. According to one example, each DAC has a sampling rate of 68 GS/s, and each amplifier has an analog bandwidth of greater than 34 GHz.

In some implementations, the DSP 126 and the DACs 130, 131, 138, 139 are comprised in a complementary metal-oxide-semiconductor (CMOS) module, and the amplifiers 134, 135, 142, 143 are comprised in a bipolar CMOS (BiCMOS) module.

An optical link 103 connecting the transmitter 101 to the receiver 105 comprises spans 146 of optical fiber which are coupled by optical amplifiers 148 for signal amplification. According to some examples, the spans 146 may be ~80 km in length. For simplicity, only three spans 146 and three optical amplifiers 148 are illustrated in the optical link 103. Typically, the number of spans 146 and the number of optical amplifiers 148 in an optical link is much larger.

The receiver 105 is configured to receive an optical signal 150 output by the optical link 103. The receiver 105 comprises a polarizing beam splitter 151 configured to split the received optical signal 150 into polarized components 152, 153, for example, orthogonally polarized components corresponding to an X polarization and a Y polarization, respectively. The receiver 105 comprises optical hybrids 154, 155 configured to process the polarized components 152,153 with respect to polarized components 156, 157 of a local optical signal 159 produced by a laser 160, where the local optical signal 159 is split into the polarized components 156, 157, for example, by a polarizing beam splitter 158. Where the optical hybrid 154 operates on the X polarization it may generate optical signals 161, 162 corresponding to dimensions XI, XQ, respectively, which denote the I and Q components of the X polarization. Where the optical hybrid 155 operates on the Y polarization it may generate optical signals 163, 164 corresponding to dimensions YI, YQ, respectively, which denote the I and Q components of the Y polarization. The optical signals 161, 162, 163, 164 may be converted by respective photodetectors 165, 166, 167, 168 into analog electrical signals. Together, elements such as the beam splitters 151, 158, the laser 160, the optical hybrids 154, 155, and the photodetectors 165, 166, 167, 168 may be referred to as a communication interface of the receiver 105. The analog electrical signals may be amplified by radiofrequency (RF) pre-amplifiers 169, 170, 171, 172, thereby resulting in respective amplified analog signals 173, 174, 175, 176. Analog-to-digital converters (ADCs) 177, 178, 179, 180 are configured to sample the analog signals 173, 174, 175, 176, respectively, and to generate digital signals 182, 184, 186, 188 corresponding to the dimensions XI, XQ, YI, YQ, respectively.

An application specific integrated circuit (ASIC) 190 is configured to apply digital signal processing to the digital signals 182, 184, 186, 188 using a digital signal processor (DSP) 192. According to some examples, the DSP 192 may perform equalization processing designed to compensate for a variety of channel impairments, such as CD, SOP rotation, PMD including group delay (GD) and differential group delay (DGD), PDL or PDG, and other effects. The DSP 192 may further perform carrier recovery processing, which includes calculating an estimate of carrier frequency offset (i.e., the difference between the frequency of the transmitter laser 102 and the frequency of the receiver laser 160). According to some examples, the DSP 192 may further perform operations such as multiple-output (MIMO) filtering, clock recovery, and FDM subcarrier de-multiplexing. The DSP 192 may further perform symbol-to-bit de-mapping (or decoding) using a decision circuit to generate signals 194 representative of bit estimates.

Figure 2:
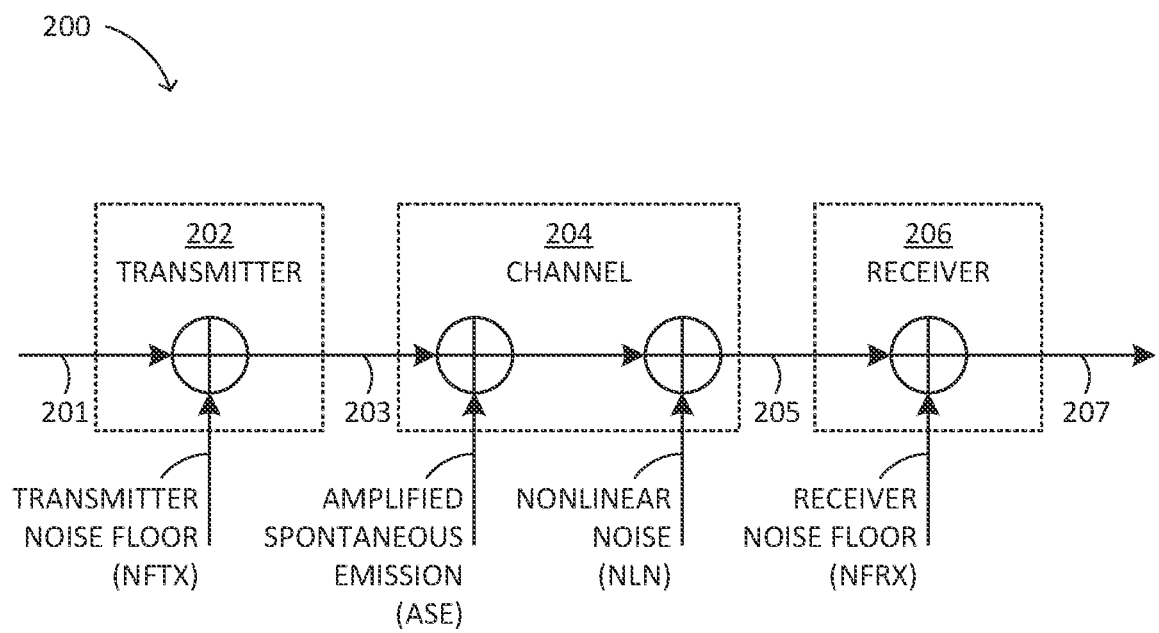
FIG. 2 illustrates a schematic representing noise contributions to an optical signal during propagation in an example optical communication system.

FIG. 2 illustrates a schematic 200 representing noise contributions to an optical signal 201 during propagation in an example communication system comprising a transmitter 202 and a receiver 206 which are connected via a channel 204. As the optical signal or waveform 201 is transmitted from the transmitter 202 to the receiver 206 via the channel 204, it is impacted by various sources of noise. Specifically, the transmitter 202 outputs a signal 203 that is dependent on the input signal 201 and the noise floor of the transmitter, herein denoted by NFTX. The channel 204 outputs a signal 205 that is dependent on the signal 203 input to the channel 204 and also on the noise contributed by the channel 204, where the channel noise may include amplified spontaneous emission, herein denoted by ASE, as well as nonlinear noise caused by the Kerr effect, herein denoted by NLN. The Kerr nonlinearities may be categorized as intra-channel noise or crosstalk if generated by the waveform 201 itself, or inter-channel noise or crosstalk if generated by the presence of neighbouring channels in a multi-channel communication system such as a wavelength division multiplexing (WDM) system. A signal 207 measured at the receiver 206 is dependent on the signal 205 input to the receiver 206 and also on the noise floor of the receiver, herein denoted by NFRX.

According to the schematic 200, the power spectral density (PSD) of the total noise in the signal 207 measured at the receiver 206 at a frequency f, herein denoted by $S_{RX}(f)$, may be represented as:

$$S_{RX}(f) = S_{NFTX}(f) + S_{NFRX}(f) + S_{NLN}(f) + S_{ASE}(f) \quad [1]$$

where $S_{NFTX}(f)$ denotes the PSD of the transmitter noise floor, where $S_{NFRX}(f)$ denotes the PSD of the receiver noise floor, where $S_{NLN}(f)$ denotes the PSD of the nonlinear noise, and where $S_{ASE}(f)$ denotes the PSD of the ASE noise.

The PSD terms in Equation 1 may be integrated over a frequency range of interest to obtain the following expression for the total noise power, $P_{RX}$, over the frequency range of interest:

$$P_{RX} = P_{NFTX} + P_{NFRX} + P_{NLN} + P_{ASE} \quad [2]$$

where $P_{NFTX}$, $P_{NFRX}$, $P_{NLN}$, and $P_{ASE}$ denote the powers of the transmitter noise floor, receiver noise floor, nonlinear noise, and ASE noise, respectively, over the frequency range of interest.

According to some examples, the PSD of the nonlinear noise, $S_{NLN}(f)$, may be modeled using four wave mixing (FWM), wherein three frequency components, $f_1$, $f_2$, and $(f_1+f_2-f)$ interact in a medium to produce a component at a fourth frequency component, f. This interaction is shown in the formulation of the Gaussian Noise (GN) model, expressed as:

$$S_{NLN}(f) = \int_{-\infty}^{\infty} \int_{-\infty}^{\infty} S_W(f_1) S_W(f_2) S_W(f_1 + f_2 - f) FWM(f_1, f_2, f, \theta) df_1 df_2 \quad [3]$$

where $S_W(f_1)$ denotes the PSD of a waveform W at a first frequency $f_1$, where $S_W(f_2)$ denotes the PSD of the waveform W at a second frequency $f_2$, where $S_W(f_1+f_2-f)$ denotes the PSD of the waveform W at a third frequency $(f_1+f_2-f)$, and where $FWM(f_1, f_2, f, \theta)$ denotes a weighting term that varies as a function of the frequencies $f, f_1, f_2$, and a variable $\theta$ that accounts for link details such as topology, power profile, dispersion map, and the link.

It is of interest to be able to extract or quantify the noise contributed by various sources in a communication system. According to the technology described herein, by applying one or more perturbations to a waveform transmitted in the communication system, it may be possible to extract information about the noise in the system. As used herein, the term "perturbation" may be understood as a spectrally selective modification of the amplitude of an original waveform or signal, thereby resulting in a perturbed waveform or signal, where the amplitude perturbation(s) may be limited to one or more sets of contiguous frequencies. For example, a perturbation may comprise a spectral notch in the waveform, that is, a spectral region of the waveform wherein the amplitude is either zero or substantially lower than the average PSD of the waveform, and where the frequency range of the region is a fraction of the total bandwidth of the waveform. Alternatively or additionally, a perturbation may comprise an increase or a decrease in the amplitude of the waveform over a selected spectral region. In general, a perturbed signal may be generated by perturbing an amplitude of an original signal at one or more selected spectral regions within a spectrum of the original signal. It is contemplated that a perturbed waveform may additionally include spectrally selective perturbations to the phase of an original waveform. According to some examples, in order to mimic normal transmission conditions in the communication system being assessed, the perturbed signal may be designed to have a spectral extent, shape, and power substantially similar to that of a transmission use case, except for the perturbation(s). Thus, the original signal/waveform may represent a typical signal/waveform propagated in the communication system during normal operation, while the perturbed signal/waveform may be generated by perturbing the amplitude of the original signal/waveform over one or more sets of contiguous frequencies, while still substantially maintaining the overall spectral extent, shape, and power of the original signal/waveform.

Figure 3:
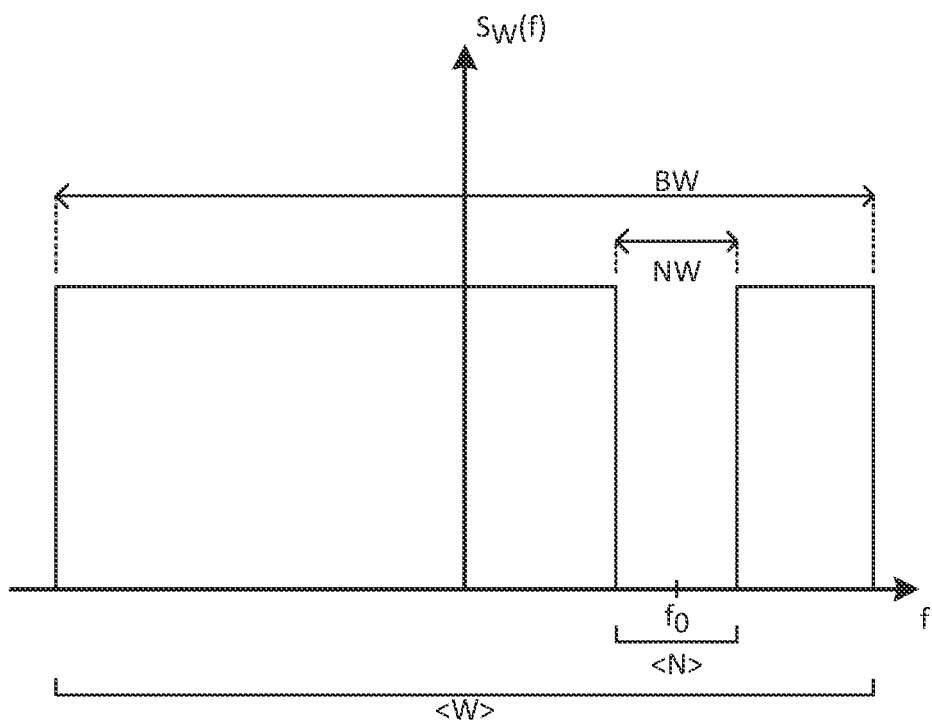
FIG. 3 illustrates a frequency spectrum of a perturbed waveform comprising a single spectral notch in accordance with some examples of the proposed technology.

FIG. 3 illustrates a PSD of a perturbed waveform, denoted by $S_W(f)$, comprising a single spectral notch in accordance with some examples of the proposed technology. The perturbed waveform has a bandwidth BW. The set of frequencies within the waveform bandwidth BW is denoted by $<W>$. The notch region is located at a center frequency denoted by $f_0$, and has a spectral bandwidth NW. The contiguous set of frequencies within the notch bandwidth NW is denoted by $<N>$. According to some examples, the waveform bandwidth BW and the frequencies therein $<W>$ may be understood as representing a "bandwidth of interest", meaning that the perturbed waveform may comprise a larger total bandwidth, but the bandwidth of interest, expressed by BW or $<W>$, is the relevant portion of the total bandwidth for the purposes of certain examples.

According to some examples, given an original (unperturbed) waveform having a frequency spectrum denoted by $W_{orig}(f)$, the frequency spectrum of a perturbed waveform, $W_{pert}(f)$, may be expressed as follows:

$$W_{pert}(f) = W_{orig}(f) \times H_{pert}(f) \quad [4]$$

where $H_{pert}(f)$ denotes a perturbation transfer function or perturbation filter. The perturbed waveform illustrated in FIG. 3 may be generated using the following perturbation filter:

$$H_{pert}(f) = \begin{cases} 0, & f \in <N> \\ 1, & \text{otherwise} \end{cases} \quad [5]$$

In some examples, it may be of interest to ensure that, even with the presence of the perturbation(s), the perturbed waveform maintains the same power as the original waveform over the bandwidth of the waveform. To this end, a multiplicative normalization factor $\sqrt{\text{norm}}$ may be applied to the waveform in the linear domain, where norm is expressed as follows:

$$\text{norm} = \frac{\int_{<W>} |W_{orig}(f)|^2 df}{\int_{<W>} |W_{pert}(f)|^2 df} \quad [6]$$

According to one example, by using the normalization factor $\sqrt{\text{norm}}$, it may be possible to maintain a constant PSD of the ASE noise, $S_{ASE}(f)$, over multiple experiments. In practice, a perturbed waveform comprising a notch may be designed such that the spectral width NW of the notch occupies a small fraction of the waveform bandwidth of the interest BW. According to some examples, NW may be small enough relative to BW that norm≈1.

For the purposes of the following discussion, certain assumptions may be made regarding the properties of the various noise contributions. In particular, it may be assumed that the noise floors of the transmitter and the receiver, characterized by the PSD terms $S_{NFTX}(f)$ and $S_{NFRX}(f)$, respectively, depend only on the total power of the waveform, and are independent of the spectral shape of the waveform. That is, as long as the perturbed waveform $W_{pert}(f)$ has the same power as the original waveform $W_{orig}(f)$, the PSD terms $S_{NFTX}(f)$ and $S_{NFRX}(f)$ are assumed not to change. It may also be assumed that the PSD term $S_{ASE}(f)$ is only dependent on the aggregate total input power to the optical amplifier(s) from which the ASE originates, and is independent of the spectral shapes of the input channels. That is, as long as the input power of an optical amplifier is kept constant, the ASE noise of that optical amplifier is assumed not to change.

The communication system represented by the schematic 200 includes a channel over an optical link, such as the optical link 103. However, other communication systems are contemplated. For example, a communication system may comprise a transmitter and a spectrum measurement device (SMD) that are directly connected to one another in a back-to-back configuration. The SMD may comprise, for example, an optical spectrum analyzer (OSA), an electrical spectrum analyzer (ESA), or a receiver capable of performing spectral measurements. This type of communication system comprising a back-to-back configuration of a transmitter device and a SMD still includes a noise contribution from the transmitter noise floor. However, in the absence of the optical fiber channel, there are no contributions from ASE or from any NLN originating from propagation through the optical fiber. The SMD itself may contribute a noise floor, herein denoted by NFSMD.

According to some examples, transmission of a perturbed waveform in a communication system comprising a back-to-back configuration of a transmitter and a SMD may enable the extraction of information about the noise floors of the transmitter and the SMD in any given frequency range. The perturbed waveform may be designed to have at least one notch region <N> over which the PSD of the perturbed waveform is zero. Since the perturbed waveform generated by the transmitter has no waveform energy in the notch region <N>, it follows that that power detected at the SMD in the notch region <N> is equivalent to the noise power of the transmitter and SMD noise floors, which may be expressed as:

$$P_{SMD} = P_{NFTX} + P_{NFSMD} = \int_{<N>}(S_{NFTX}(f) + S_{NFSMD}(f))df. \quad [7]$$

By integrating the PSD of the total noise detected at the SMD over the notch region <N>, it is possible to obtain an estimate of $(P_{NFTX}+P_{NFSMD})$ corresponding to that frequency range <N>. In the case where the SMD comprises an OSA or an ESA, the SMD noise floor may be negligible relative to the transmitter noise floor, such that $P_{NFTX} \approx P_{SMD}$. In the event that $(S_{NFTX}(f)+S_{NFSMD}(f))$ is substantially flat over the notch region <N>, Equation 7 may be simplified as follows:

$$(S_{NFTX}(f) + S_{NFSMD}(f))|_{f \in <N>} = \frac{P_{SMD}}{NW}. \quad [8]$$

That is, assuming a flat PSD, the sum $(S_{NFTX}(f)+S_{NFSMD}(f))$ for any frequency f within the notch region <N> may be calculated as the total noise power $P_{SMD}$ accumulated over the notch region <N> divided by the notch bandwidth NW. According to some examples, the notch bandwidth NW may be designed to occupy a small fraction of the waveform bandwidth of the interest BW so as not to contaminate the noise floor measurements.

Figure 4:
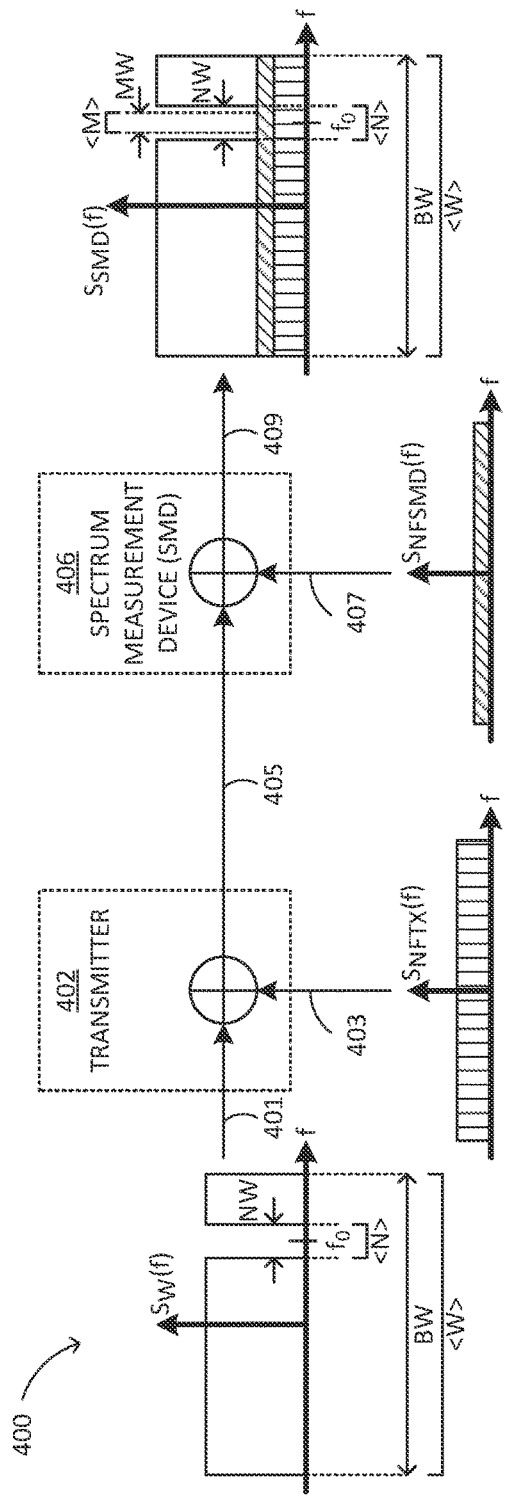
FIG. 4 illustrates a schematic representing the use of a single-notch perturbed waveform for estimating a noise floor in a communication system comprising a transmitter and a spectrum measurement device (SMD) in a back-to-back configuration in accordance with some examples of the proposed technology.

FIG. 4 illustrates a schematic 400 representing the use of a single-notch perturbed waveform 401 for estimating a noise floor of an optical communication system comprising a transmitter 402 and a SMD 406. A frequency spectrum <W> of the perturbed waveform 401 has a bandwidth of interest BW comprising a notch region <N> of width NW centered at a frequency $f_0$. The transmitter 402 outputs a signal 405 having a PSD that is a sum of the PSD of the perturbed waveform 401, $S_W(f)$, and the PSD of the transmitter noise floor 403, $S_{NFTX}(f)$. The SMD 406 then measures a signal 409 having a PSD that is a sum of the PSD of the signal 405 input to the SMD 406 and the PSD of the SMD noise floor 407, $S_{NFSMD}(f)$. The PSD of the signal 409 may be denoted by $S_{SMD}(f)$. As is apparent from FIG. 4, at any given frequency f within the notch region <N>, the value of $S_{SMD}(f)$ is representative of $(S_{NFTX}(f)+S_{NFSMD}(f))$.

As described with respect to Equation 4, $S_{SMD}(f)$ may be integrated over the notch frequencies <N> to obtain an estimate of $(P_{NFTX}+P_{NFSMD})$ within that frequency range. In practice, a subset of the notch frequencies <N> may be used for this calculation so as to avoid interpreting any transmitter nonlinearities as the noise floor. For example, as illustrated in FIG. 4, the integration may be performed over a frequency range <M> of bandwidth MW that is centered at the frequency $f_0$ but excludes the highest and lowest frequencies of the notch region <N>, such that <M>⊆<N> and MW<NW.

According to some examples, multiple measurements may be acquired while shifting the notch region across the bandwidth of the waveform in order to measure the noise floor in different frequency bands. That is, a plurality of perturbed waveforms having a respective plurality of different values for the center frequency $f_0$ of the notch region may be used, where each perturbed waveform has the same total power, thereby enabling measurement of $(P_{NFTX}+P_{NFSMD})$ in different frequency ranges within the bandwidth of interest BW.

The creation of a waveform comprising a single spectral notch may be achieved by destructive and constructive additions of I and Q components, which can result in the signal being susceptible to uncompensated I/Q crosstalk, I/Q imbalance, and uncompensated transmitter and receiver phase. According to some examples, a perturbed waveform may be designed to comprise two notch regions which are substantially symmetric with respect to the center of the waveform spectrum. This type of dual-notch perturbation may be created by zeroing the DAC field instructions over two ranges of the frequencies having two respective central frequencies that are substantially symmetrically disposed, thereby excluding I/Q crosstalk from the notch region.

Figure 5:
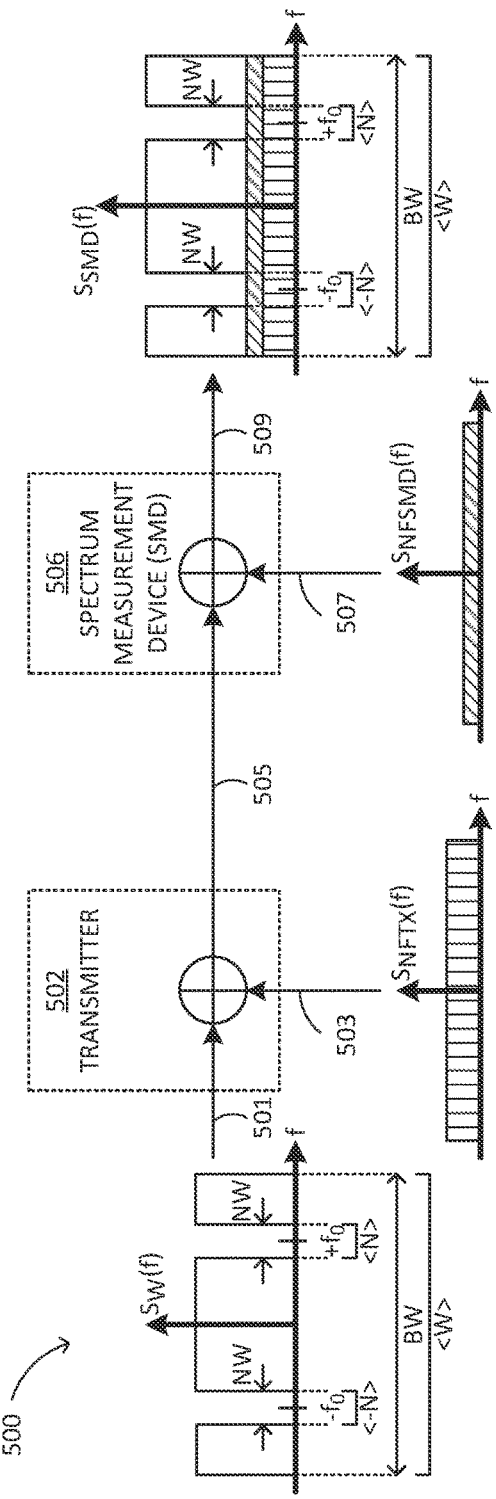
FIG. 5 illustrates a schematic representing the use of a dual-notch perturbed waveform for estimating a noise floor in a communication system comprising a transmitter and an SMD in a back-to-back configuration in accordance with some examples of the proposed technology.

FIG. 5 illustrates a schematic 500 representing the use of a dual-notch perturbed waveform 501 for estimating a noise floor of an optical communication system comprising a transmitter 502 and a SMD 506. A frequency spectrum <W> of the perturbed waveform 501 has a bandwidth of interest BW comprising two notch regions <−N> and <N> centered at frequencies $-f_0$ and $+f_0$, respectively. Each notch region has a bandwidth of NW. The transmitter 502 outputs a signal 505 having a PSD that is a sum of the PSD of the perturbed waveform 501, $S_W(f)$, and the PSD of the transmitter noise floor 503, $S_{NFTX}(f)$. The SMD 506 then measures a signal 509 having a PSD that is a sum of the PSD of the signal 505 input to the SMD 506 and the PSD of the SMD noise floor 507, $S_{NFSMD}(f)$. The PSD of the signal 509 may be denoted by $S_{SMD}(f)$. As is apparent from FIG. 5, at any given frequency f within either notch region <−N>, <N>, the value of $S_{SMD}(f)$ is representative of $(S_{NFTX}(f)+S_{NFSMD}(f))$. Measurements may be acquired over one or both of the two notch regions. Acquiring measurements from both notch regions may improve measurement SNR by a factor of approximately √.

As described with respect to Equation 4, $S_{SMD}(f)$ may be integrated over one or both of the notch regions <N> and <−N> to obtain an estimate of $(P_{NFTX}+P_{NFSMD})$ within that frequency range. In practice, a subset of the one or both notch regions <N> and <−N> may be used for this calculation so as to avoid interpreting any transmitter unequalized I/Q crosstalk or power imbalance as the noise floor.

According to some examples, multiple measurements may be acquired while shifting the notch region across the waveform bandwidth of interest in order to measure the noise floor at different frequencies. That is, a plurality of perturbed waveforms having a respective plurality of different values for the center frequency $f_0$ of the notch region <N> may be used (or, in the case of a dual-notch perturbed waveform, center frequencies $-f_0$ and $+f_0$ corresponding to the symmetrical notch regions <−N> and <N>, respectively), where each perturbed waveform has the same total power, thereby enabling measurement of $(P_{NFTX}+P_{NFSMD})$ in different frequency ranges within the bandwidth of interest BW. These measurements may be "stitched together" to form $S_{SMD}(f)$.

According to some examples, a single perturbed waveform may comprise a plurality of notch regions (e.g., two or more) distributed over the waveform bandwidth of interest, thereby enabling measurements of the noise floor at different frequencies using the single perturbed waveform. The notches may be arranged in substantially symmetric pairs, or any other desired distribution.

The signal to noise distortion ratio (SNDR) for a given notch region <N> centered at frequency $f_0$ may be calculated as follows:

$$SNDR(f_0) = \frac{\int_{<N>} |W_{orig}(f)|^2 \, df}{\int_{<N>} (S_{NFTX}(f) + S_{NFSMD}(f)) df} \quad [9]$$

Figure 6:
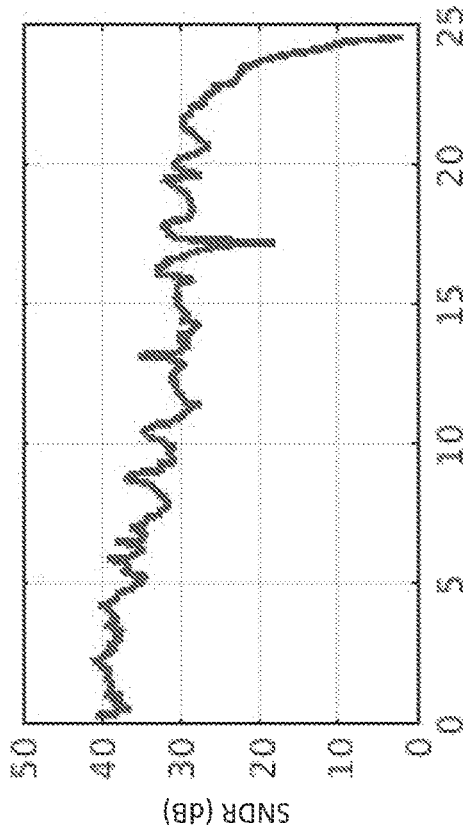
FIG. 6 illustrates a plot of signal to noise distortion ratio (SNDR) as a function of frequency as experimentally measured at an electrical spectrum analyzer (ESA) using a dual-notch perturbed waveform originating from a transmitter in a back-to-back configuration with the ESA.
Figure 7:
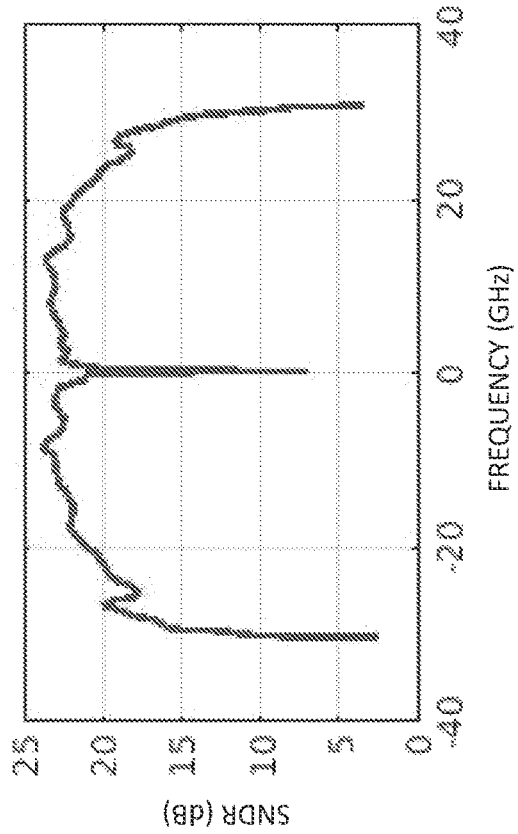
FIG. 7 illustrates a plot of SNDR as a function of frequency as experimentally measured at an optical spectrum analyzer (OSA) using a dual-notch perturbed waveform originating from a transmitter in a back-to-back configuration with the OSA.
Figure 8:
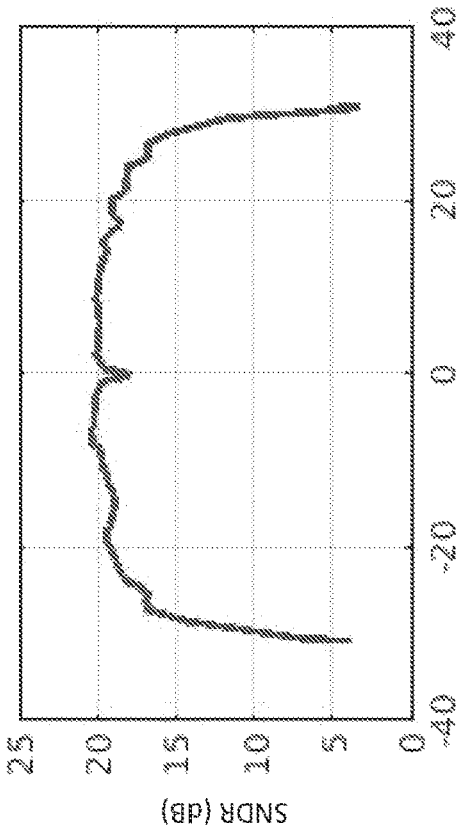
FIG. 8 illustrates a plot of SNDR as a function of frequency as experimentally measured at a coherent optical receiver using a dual-notch perturbed waveform originating from a transmitter in a back-to-back configuration with the coherent optical receiver.

FIGS. 6, 7, and 8 illustrate plots of SNDR in dB as a function of the notch center frequency $f_0$ in GHz as experimentally measured at three different types of SMDs using a dual-notch perturbed waveform originating from a transmitter in a back-to-back configuration with the respective SMD. The measurements were obtained by shifting a dual-notch perturbation across the bandwidth of the transmitted waveform. The notch width used for FIG. 6 was 4 GHz, while the notch width used for FIGS. 7 and 8 was 2 GHz.

FIG. 6 illustrates the SNDR as a function of frequency as measured using an ESA at the output of a DAC of the transmitter. At this stage, the baseband signal may be fully represented by its positive frequencies. The noise floor of the ESA may be considered negligible, such that the SNDR in FIG. 6 is substantially representative of the signal spectrum relative to the noise floor of the transmitter at the DAC output, which is mainly affected by quantization noise.

FIG. 7 illustrates the SNDR as a function of frequency as measured using an OSA at the output of the transmitter. The noise floor of the OSA may be considered negligible, such that the SNDR in FIG. 7 is substantially representative of the noise floor of the transmitter, which includes both electrical noise and optical noise.

FIG. 8 illustrates the SNDR as a function of frequency as measured using a coherent optical receiver connected at the output of the transmitter. The SNDR in FIG. 8 is substantially representative of the noise floor of the transmitter, as well as optical noise and electrical noise up to the ADC output of the receiver. The SNDR does not include any DSP noise since the spectrum is captured immediately after the ADC, prior to any DSP processing.

Figure 9:
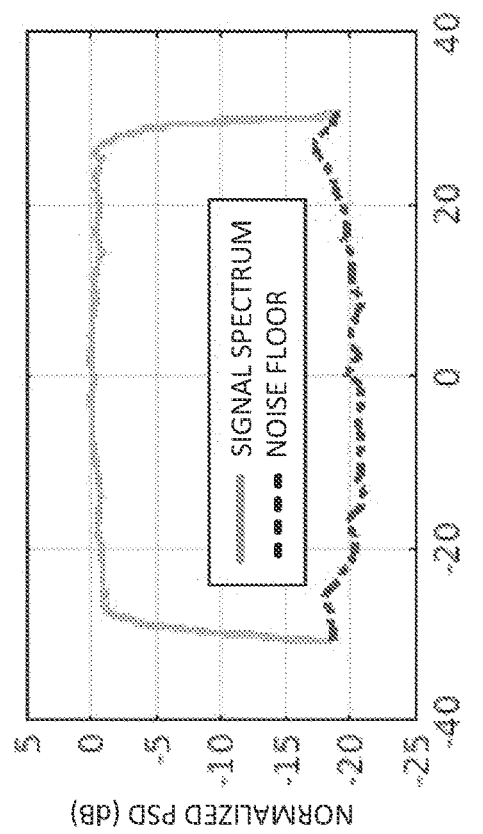
FIG. 9 illustrates a plot of normalized power spectral density (PSD) as a function of frequency as measured at a coherent optical receiver using a dual-notch perturbed waveform originating from a transmitter in a back-to-back configuration with the coherent optical receiver.

FIG. 9 illustrates a plot of normalized PSD of a signal and a noise floor in dB as a function of frequency in GHz as measured at a coherent optical receiver using a dual-notch perturbed waveform originating from a transmitter in a back-to-back configuration with the coherent optical receiver. Initially, an original waveform $W_{orig}(f)$ having a bandwidth BW was transmitted by the transmitter, and subsequently measured at the coherent optical receiver, the measured waveform at the receiver representing the sum of the power of the original waveform $W_{orig}(f)$ and the as-yet-unknown noise floor of the communication system. Using the dual-notch method described above, the PSD of the noise floor of the communication system was extracted by performing a series of measurements on a respective series of perturbed waveforms, each perturbed waveform having notch regions <N> and <−N> located in different frequency bands within the bandwidth BW. The measurements were then combined or stitched together to form the PSD of the noise floor of the system. By subtracting the noise floor from the measured waveform at the coherent optical receiver, it is possible to recover an estimate of the original waveform $W_{orig}(f)$ over the bandwidth BW (i.e., the signal spectrum).

By observing the evolution of the measured noise floor as a function of various perturbation filters, it may be possible to estimate uncompensated I/Q skew impairments. According to some examples, a perturbed waveform may be generated which comprises a single notch in a frequency range <−N>, while the amplitude of the waveform remains unperturbed in the symmetrically disposed frequency range <N>. Thus, the amplitude of the perturbation filter may be expressed as:

$$|H_{pert}(f)| = \begin{cases} 0, & f \in <-N> \\ 1, & \text{otherwise} \end{cases} \quad [10]$$

However, the phase of either the I component or the Q component may be modified in the frequency range <N> according to:

$$H_{phase}(f) = \begin{cases} \exp(j\theta(f)), & f \in (<N>) \\ 1, & \text{otherwise} \end{cases} \quad [11]$$

where $\theta(f)$ denotes a general function of the frequency f. In this example, the value of $H_{phase}(f)$ is set to 1 for frequencies outside of the region <N>, but it could be set to another value since the power measurement in the notch region <−N> is only sensitive to $H_{phase}(f)$ within the region <N>. For the case of an uncompensated I/Q skew, $\theta(f)=\pm 2\pi c f \tau_S$, where $\tau_S$ denotes an unknown time delay, and where the sign of $\theta(f)$ is determined by the relative arrival times of the I and Q components. Thus, the perturbation filter $H_{pert}(f)$ is used to attenuate the waveform power to substantially zero in the frequency range <−N>, and then the phase of either the I component or the Q component is modified by $H_{phase}(f)$, where $H_{phase}(f)$ is the frequency response corresponding to a delay is. DAC instructions may be used to sweep the value of $\tau_S$ while measuring the noise floor in the notch region <−N> (or a portion thereof). The negative value of $\tau_S$ that results in the minimum noise floor represents an estimate of the skew present between the I and Q tributaries.

Figure 10:
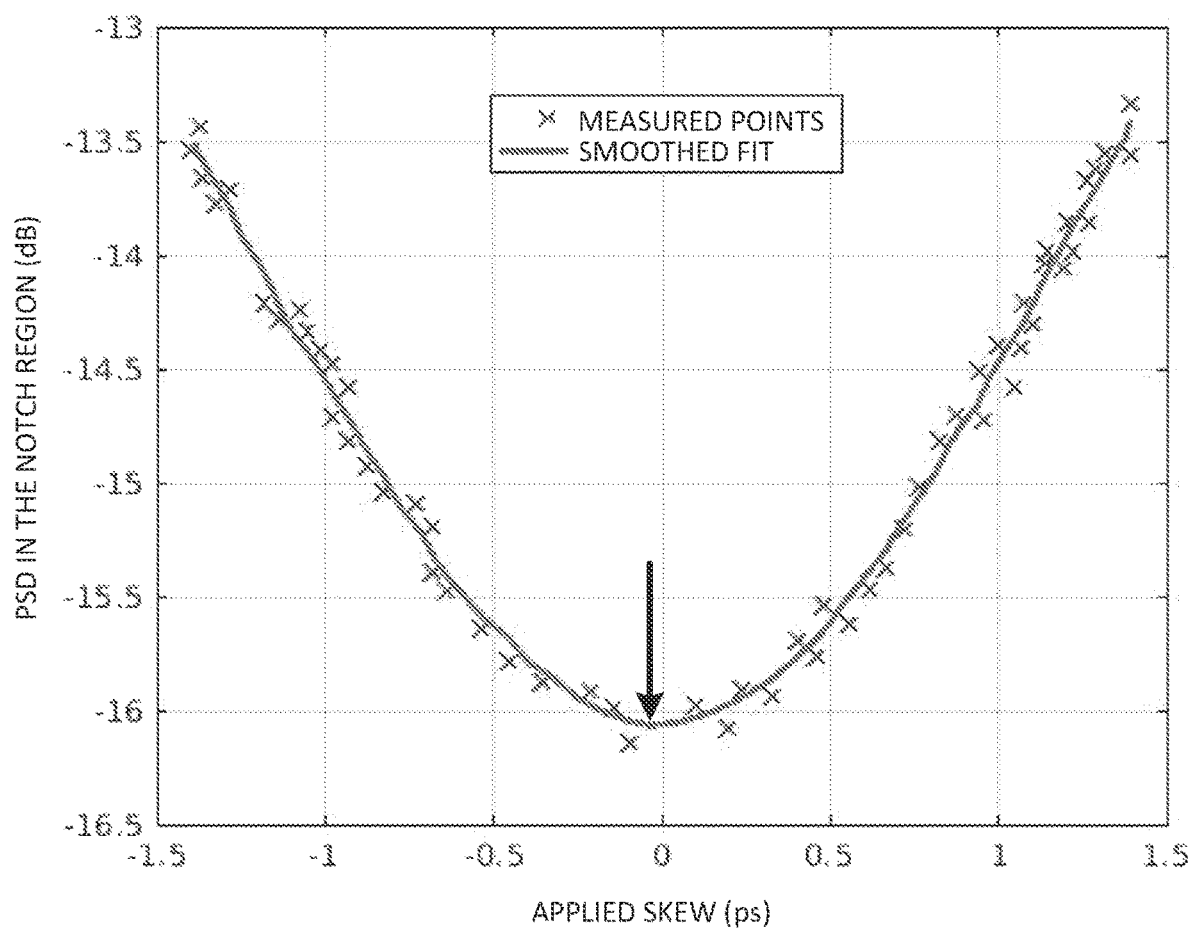
FIG. 10 illustrates a plot of PSD as a function of applied skew between in-phase (I) and quadrature (Q) tributaries as experimentally measured at an OSA using a perturbed waveform originating from a transmitter in a back-to-back configuration with the OSA.

FIG. 10 illustrates a plot of PSD in dB as a function of applied skew in ps between I and Q tributaries as experimentally measured at an OSA using multiple perturbed waveforms originating from a transmitter in a back-to-back configuration with the OSA. Each perturbed waveform was generated using a perturbation filter characterized by Equations 10 and 11, having a notch region <−N> centered at $f_0$=25 GHz, and having a different skew value $\tau_S$ ranging from $\tau_S$=−1.4 ps to $\tau_S$=+1.4 ps in steps of 0.25 ps. The PSD was measured in the notch region <−N> for each value of $\tau_S$, and a smooth curve was fit to the resulting PSD measurements. The minimum PSD measurement was obtained when the applied skew was −0.02 ps. This indicates that the skew present in the transmitter hardware is +0.02 ps. That is, the minimum value of the PSD is observed when the value of $\tau_S$ used in Equation 11 compensates for the skew existing or remaining in the transmitter.

In general, a phase perturbation characterized by the general function $\theta(f)$ may be applied over a contiguous set of frequencies that is substantially symmetrically opposed to a spectral notch, and power measurements may be performed within that notch. By repeating these measurements for different central notch frequencies $f_0$, it may be possible to obtain estimates of frequency-dependent phase offset (and, thus, corresponding phase corrections) for the frequencies over which the notch was scanned.

Contributions from ASE and/or NLN have generally been omitted from the calculations described thus far because examples have been limited to communication systems comprising a back-to-back configuration of a transmitter and a SMD. The following examples will demonstrate techniques for estimating ASE and NLN in communication systems that include one or more channels between a transmitter and a receiver.

It is apparent from Equation 3 that a change to the PSD of the waveform W is expected to impact the PSD of the nonlinear noise, $S_{NLN}(f)$. To facilitate an understanding of this impact, three non-overlapping frequency regions of a perturbed waveform $W_{pert}(f)$ will be considered: <A>, <B>, and <N>, where <N> is a zero-power region.

Under these conditions, $S_{NLN}(f)$ may be expressed as a sum of eight PSD terms according to the following expression:

$$S_{NLN}(f) = S_{NLN,(A,A,A)}(f) + S_{NLN,(A,A,B)}(f) + S_{NLN,(A,B,A)}(f) + S_{NLN,(B,A,A)}(f) + S_{NLN,(A,B,B)}(f) + S_{NLN,(B,A,B)}(f) + S_{NLN,(B,B,A)}(f) + S_{NLN,(B,B,B)}(f) \quad [12]$$

where a generic subscript of format "(X,Y,Z)" denotes that the double integral in Equation 3 is conditioned on $f_1 \in$ region <X>, $f_2 \in$ region <Y>, and $(f_1+f_2-f) \in$ region <Z>. Thus, for example, the term $S_{NLN,(A,B,A)}$ represents the nonlinear noise contribution originating from interactions between the frequency components $f_1$, $f_2$, and $(f_1+f_2-f)$, where $f_1 \in$ region <A>, where $f_2 \in$ region <B>, and where $(f_1+f_2-f) \in$ region <A>. Notably, there are no interactions involving any frequencies within the region <N>, since the perturbed waveform $W_{pert}(f)$ has zero power in that region.

For convenience, this document will use a simplified notation that does not distinguish the order of the FWM frequencies from which the nonlinear noise originates. Using the simplified notation, Equation 12 may be rewritten as follows:

$$S_{NLN}(f) = S_{NLN,(A,A,A)}(f) + S'_{NLN,(A,A,B)}(f) + S'_{NLN,(A,B,B)}(f) + S_{NLN,(B,B,B)}(f) \text{ where } S'_{NLN,(A,A,B)}(f) = S_{NLN,(A,A,B)}(f) + S_{NLN,(A,B,A)}(f) + S_{NLN,(B,A,A)}(f) \text{ and where } S'_{NLN,(A,B,B)}(f) = S_{NLN,(A,B,B)}(f) + S_{NLN,(B,A,B)}(f) + S_{NLN,(B,B,A)}(f) \quad [13]$$

As described with respect to Equation 2, $P_{RX}$ denotes the total noise power accumulated at the receiver over the frequency range of interest (for example, the zero-power region <N>), which is equivalent to the aggregate of the transmitter noise floor power $P_{NFTX}$, the receiver noise floor power $P_{NFRX}$, the nonlinear noise power $P_{NLN}$, and the ASE noise power $P_{ASE}$ over that frequency range. It may be shown that, by varying the power in the regions <A> and <B>, while maintaining a constant total power of the waveform, it is possible to vary the nonlinear noise power $P_{NLN}$, while keeping the values of $P_{NFTX}$, $P_{NFRX}$, and $P_{ASE}$ constant. Accordingly, in a single-channel system, a plurality of measurements of $P_{RX,i}$ may be performed on a respective plurality of perturbed waveforms $W_{pert,i}(f)$, for $i=1 \ldots k$, where $k \geq 5$, each perturbed waveform $W_{pert,i}(f)$ having zero power in a region <N> and a different pair of powers in regions <A> and <B>, and where each perturbed waveform $W_{pert,i}(f)$ has the same total waveform power. Constant total power may be achieved by varying the amplitudes in regions <A> and <B> by corresponding but opposite amounts, as will be described in more detail below. Using this series of experiments, the value of $P_{NLN}$ may be separated from the constant sum ($P_{NFTX}$ $P_{NFRX}$ $P_{ASE}$). Moreover, given estimates of $P_{NFTX}$ and $P_{NFRX}$, which may be obtained from an experiment involving a transmitter in a back-to-back configuration with a SMD as described previously, it may be possible to determine an estimate of the ASE noise power $P_{ASE}$.

Given a perturbed waveform $W_{pert}(f)$ characterized by a gain of $\Delta_A$ in the region <A> and a gain of $\Delta_B$ in the region <B>, where $\Delta_A$ and $\Delta_B$ are constant multiplicative factors in the linear domain, the nonlinear noise power over the zero-power region <N> may be expressed as follows:

$$P_{NLN}(\Delta_A, \Delta_B) = \int_{<N>} S_{NLN}(f) df \quad [14]$$

$$= \int_{<N>} S_{NLN,(A,A,A)}(f) + S'_{NLN,(A,A,B)}(f) + S'_{NLN,(A,B,B)}(f) + S_{NLN,(B,B,B)}(f) df$$

$$= \int_{<N>} \Delta_A^3 S^{ref}_{NLN,(A,A,A)}(f) + \Delta_A^2 \Delta_B S'^{ref}_{NLN,(A,A,B)}(f) + \Delta_A \Delta_B^2 S'^{ref}_{NLN,(A,B,B)}(f) + \Delta_B^3 S^{ref}_{NLN,(B,B,B)}(f) df$$

$$= \Delta_A^3 P^{ref}_{NLN,(A,A,A)} + \Delta_A^2 \Delta_B P'^{ref}_{NLN,(A,A,B)} + \Delta_A \Delta_B^2 P'^{ref}_{NLN,(A,B,B)} + \Delta_B^3 P^{ref}_{NLN,(B,B,B)}$$

where the subscript "ref" denotes a reference case wherein $\Delta_A = \Delta_B = 1$.

This experiment may be performed for k independent sets of $\Delta_A$ and $\Delta_B$ terms, where k denotes a positive integer, thereby resulting in the expression:

$$P_{RX,i} = P_{NFTX} + P_{NFRX} + P_{ASE} + P_{NLN}(\Delta_{A,i}, \Delta_{B,i}), \text{ for } i=1 \ldots k. \quad [15]$$

The ranges of $\Delta_{A,i}$ and $\Delta_{B,i}$ may be chosen such that they do not intersect. In order for the total power to remain constant between experiments, the amplitudes in regions <A> and <B> may be varied by corresponding but opposite amounts. That is, an increase in the amplitude of the spectrum in region <A> may be accompanied by a corresponding decrease in the amplitude of the spectrum in region <B>, where the precise values of the gain factors $\Delta_{A,i}$ and $\Delta_{B,i}$ may depend on the respective bandwidths of the regions <A> and <B>. For example, in the event that the regions <A> and <B> are designed to have the same bandwidth, each pair $(\Delta_{A,i}, \Delta_{B,i})$ may be selected so as to satisfy $(\Delta_{A,i} + \Delta_{B,i})/2 = 1$ in linear units, for $i=1 \ldots k$. For example, if k=5 and if the bandwidths of regions <A> and <B> are the same, the following five pairs of multiplicative gain factors could be used: (i) $(\Delta_{A,1}=1, \Delta_{B,1}=1)$; (ii) $(\Delta_{A,2}=1.1, \Delta_{B,2}=0.9)$; (iii) $(\Delta_{A,3}=1.2, \Delta_{B,3}=0.8)$; (iv) $(\Delta_{A,4}=1.3, \Delta_{B,4}=0.7)$; (v) $(\Delta_{A,5}=1.4, \Delta_{B,5}=0.6)$. Under these conditions, the spectrum may be renormalized to constant power after the application of the gain factors $\Delta_{A,i}$, $\Delta_{B,i}$.

When combined with the single-channel derivation in Equation 14, Equation 15 may be expressed in matrix form as follows:

$$\begin{bmatrix} P_{RX,1} \\ P_{RX,2} \\ P_{RX,3} \\ \vdots \\ P_{RX,k} \end{bmatrix} = \begin{bmatrix} \Delta_{A,1}^3 & \Delta_{A,1}^2\Delta_{B,1} & \Delta_{A,1}\Delta_{B,1}^2 & \Delta_{B,1}^3 & 1 \\ \Delta_{A,2}^3 & \Delta_{A,2}^2\Delta_{B,2} & \Delta_{A,2}\Delta_{B,2}^2 & \Delta_{B,2}^3 & 1 \\ \vdots & \vdots & \vdots & \vdots & \vdots \\ \Delta_{A,k}^3 & \Delta_{A,k}^2\Delta_{B,k} & \Delta_{A,k}\Delta_{B,k}^2 & \Delta_{B,k}^3 & 1 \end{bmatrix} \times \begin{bmatrix} P_{NLN,(A,A,A)}^{ref} \\ P_{NLN,(A,A,B)}^{ref} \\ P_{NLN,(A,B,B)}^{ref} \\ P_{NLN,(B,B,B)}^{ref} \\ P_{ASE}^{ref} + P_{NFTX}^{ref} + P_{NFRX}^{ref} \end{bmatrix}$$

[16]

which is equivalently expressed as:

$$\vec{P}_{RX} = \delta \times \vec{P}^{ref} \quad [17]$$

where $\vec{P}_{RX}$ denotes a vector of length k, where $\delta$ denotes a matrix of size k×5, and where $\vec{P}^{ref}$ denotes a vector of length 5. A given term $P_{RX,i}$ in the vector $\vec{P}_{RX}$ may be obtained by measuring $S_{RX,i}(f)$ and integrating over a range of frequencies satisfying f∈<N>. As described with respect to the example of FIG. 4, the integration may be performed over a frequency range <M> that excludes the highest and lowest frequencies of the notch region <N>, such that <M>⊆<N>. Provided that k≥5, the vector $\vec{P}^{ref}$ can be computed using a Moore-Penrose pseudo inverse as follows:

$$\vec{P}^{ref} = (\delta^T \delta)^{-1} \delta^T \vec{P}_{RX} \quad [18]$$

where the $\delta^T$ denotes the transpose of $\delta$. The final term in the matrix $\vec{P}^{ref}$ is equal to the sum ($P_{ASE}^{ref} + P_{NFTX}^{ref} + P_{NFRX}^{ref}$). Thus, given estimates of $P_{NFTX}^{ref}$ and $P_{NFRX}^{ref}$, as obtained from an experiment performed in a back-to-back communication system (i.e., wherein the transmitter is directly connected to a SMD), it is possible to infer the value of $P_{ASE}^{ref}$.

In the event that $P_{ASE}^{ref}$ is substantially flat over the zero-power region <N>, the PSD of the ASE noise for any frequency f within the zero-power region <N> may be calculated as follows:

$$S_{ASE} \equiv S_{ASE}(f)|_{f \in <N>} = \frac{P_{ASE}^{ref}}{NW} \quad [19]$$

wherein NW denotes the width of the zero-power region <N>.

The signal-to-ASE noise ratio, $SNR_{ASE}$, may be estimated by calculating the ratio of the total power of the perturbed waveform $W_{pert}(f)$ over the frequency range <W> to the total ASE noise power within the bandwidth BW of the frequency range <W>, expressed as:

$$SNR_{ASE} = \frac{\int_{<W>} |W_{pert}(f)|^2 df}{BW \cdot S_{ASE}} \quad [20]$$

Figure 11:
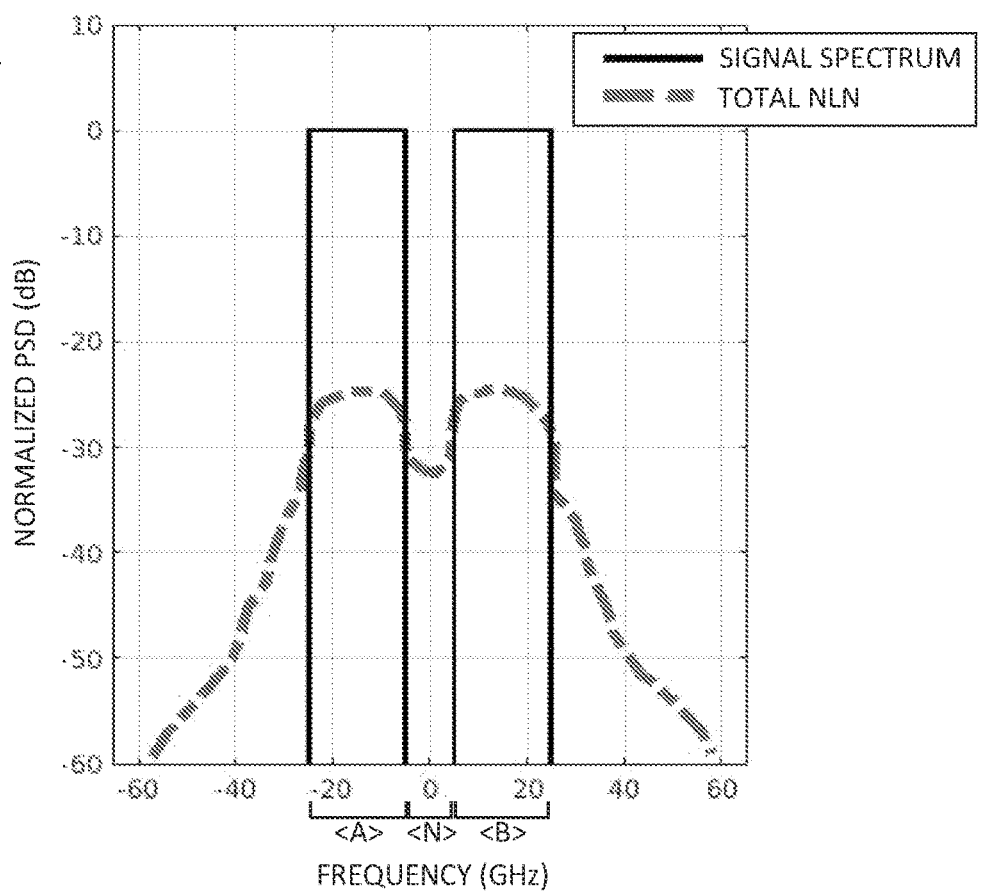
FIGS. 11, 12, and 13 illustrate plots of normalized total nonlinear noise PSD as a function of frequency as determined using split-step simulations of single-channel propagation of a perturbed waveform over a multi-span optical link.
Figure 12:
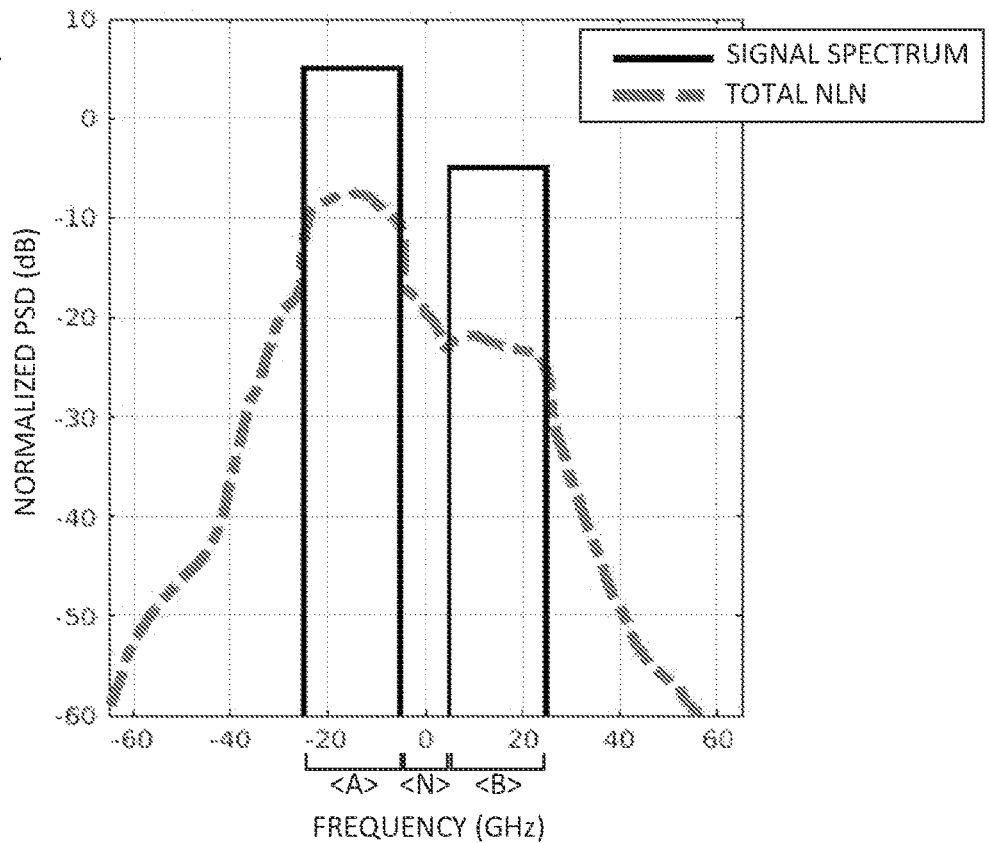
Figure 13:
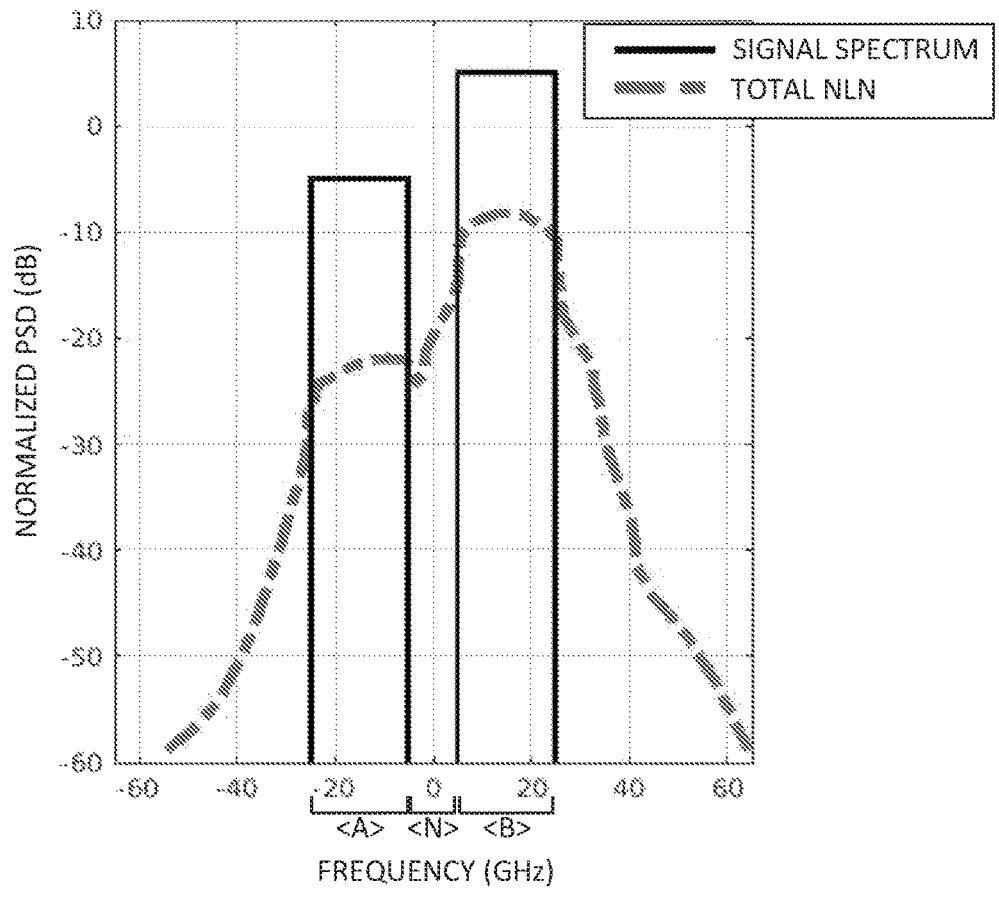

FIGS. 11, 12, and 13 illustrate plots of normalized total nonlinear noise PSD in dB, corresponding to $S_{NLN}(f)$ in Equations 13 and 14, as a function of frequency, f, in GHz as determined using split-step simulations of single-channel propagation of a perturbed waveform over an optical link comprising ten spans of a standard single mode fiber (SSMF-28), with a 2-dBm launch power into each span. The signal spectrum of the perturbed waveform is characterized by a gain of $\Delta_A$ in a region <A> of bandwidth 20 GHz, a gain of $\Delta_B$ in a region <B> of bandwidth 20 GHz, and a zero-power region <N> of bandwidth 10 GHz located between the regions <A> and <B>. The channel bandwidth is the combined bandwidth of the regions <A>, <N> and <B>. The multiplicative gain factors $\Delta_A$ and $\Delta_B$ in FIGS. 11, 12, and 13 are shown in decibels rather than linear units. FIG. 11 illustrates the simulation results for the reference case where $\Delta_A=\Delta_B=0$ dB (equivalent to $\Delta_A=\Delta_B=1$ in linear units). FIG. 12 illustrates the simulation results for the case where $\Delta_A=+5$ dB and $\Delta_B=-5$ dB. FIG. 13 illustrates the simulation results for the case where $\Delta_A=-5$ dB and $\Delta_B=+5$ dB. The plots in FIGS. 11, 12, and 13 represent examples of three independent experiments that may be used, in addition to two more experiments (not shown), to generate a vector $\vec{P}_{RX}$ of length k=5 that may be used to calculate $\vec{P}^{ref}$ according to Equation 18 (in the context of Equation 16).

Figure 14:
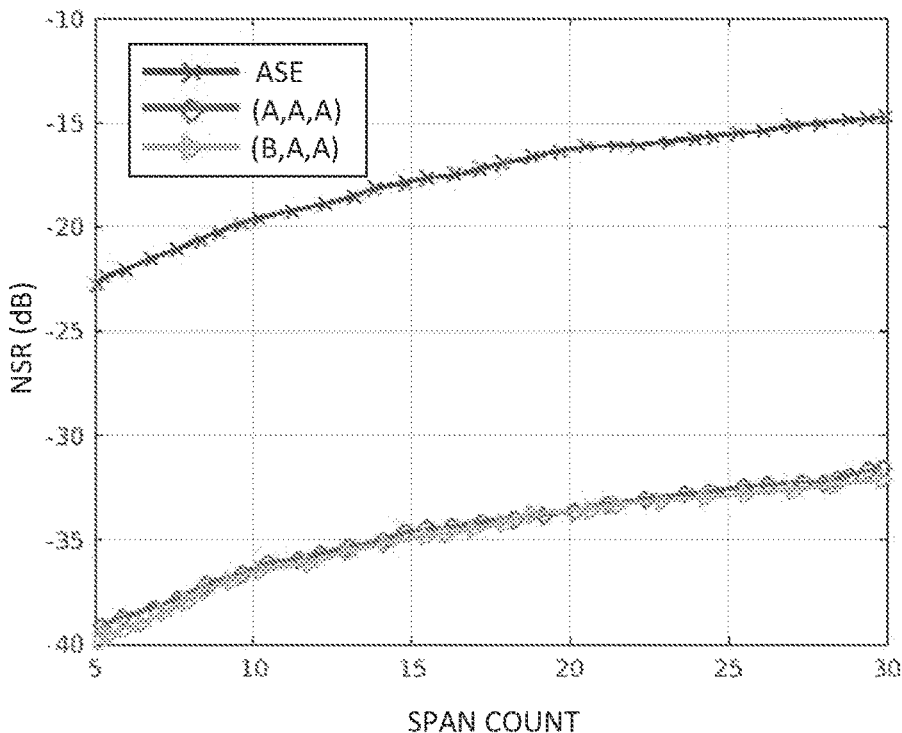
FIG. 14 illustrates a plot of noise to signal ratio (NSR) of amplified spontaneous emission (ASE) and two categories of intra-channel nonlinear noise as a function of span count as determined using split-step simulations of single-channel propagation of a perturbed waveform over a multi-span optical link.

FIG. 14 illustrates a plot of NSR in dB for three different noise sources as a function of span count as determined using split-step simulations of single-channel propagation of a perturbed waveform over a multi-span optical link, where the noise sources comprise ASE, intra-channel nonlinear noise originating from (A,A,A) interactions, and intra-channel nonlinear noise originating from (B,A,A) interactions. Each span comprises 100 km of SSMF-28 fiber. A signal with a total spectral occupancy of 50 GHz was used, where the notch region <N> was 10 GHz wide, and where the regions <A> and <B> were each 20 GHz wide. Estimates of $P_{NFTX}^{ref}$ and $P_{NFRX}^{ref}$ were obtained from a back-to-back experiment, thereby allowing for the inference of $P_{ASE}^{ref}$, as described with respect to Equations 16-18.

Many different choices of regions <A> and <B> are possible, provided that their respective bandwidths and gain factors are selected such that the power remains constant between experiments.

Figure 15:
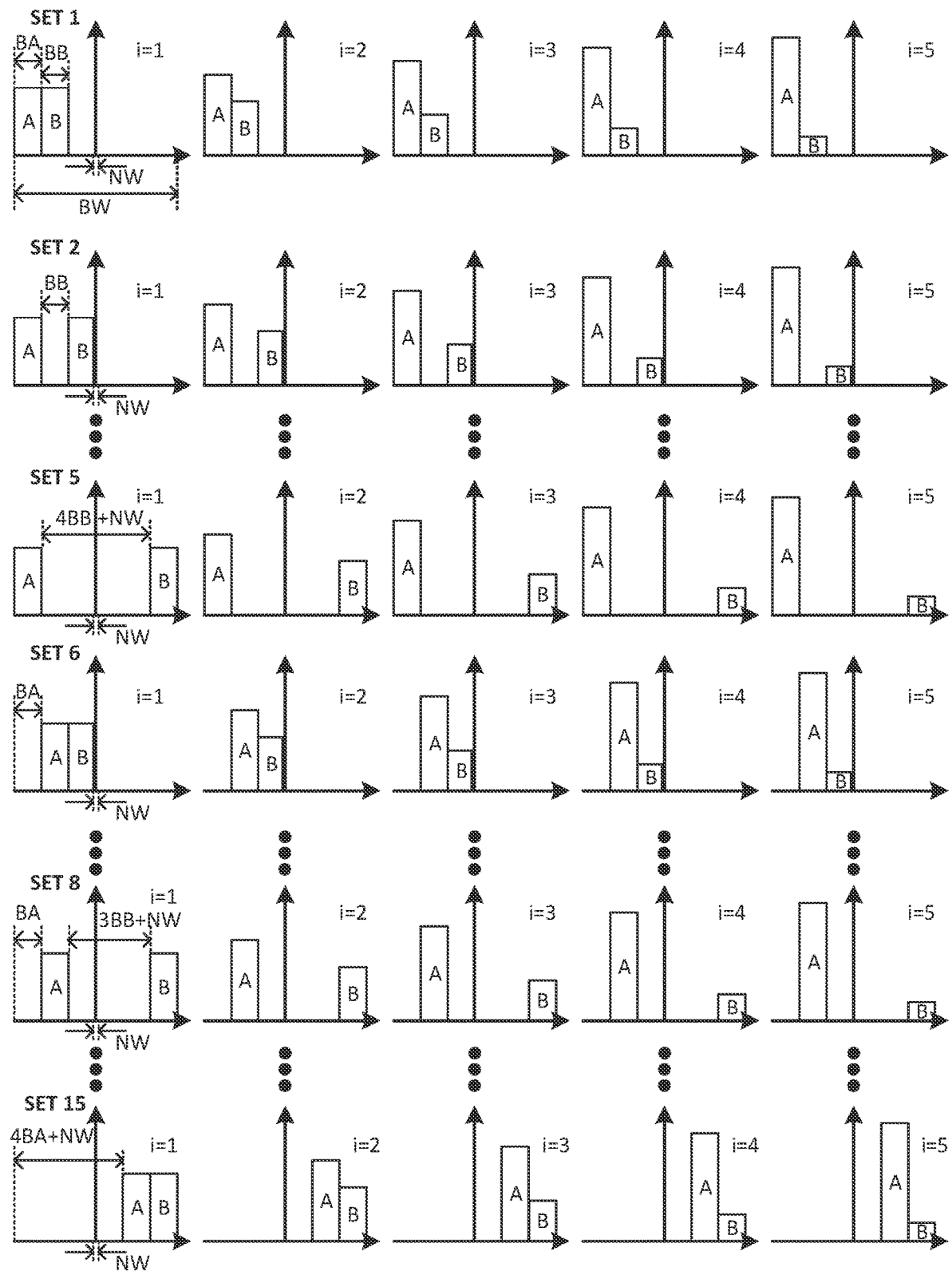
FIG. 15 illustrates example spectra for multiple sets of experiments that may be performed using perturbed waveforms having perturbed regions <A> and <B> in different locations.

FIG. 15 illustrates example spectra for multiple sets of experiments that may be performed using perturbed waveforms having perturbed regions <A> and <B> in different locations within the bandwidth of interest BW. Each perturbed waveform comprises a notch region <N> having a bandwidth NW. Regions <A> and <B> have respective bandwidths BA and BB, where BA+BB<BW. For ease of explanation, this example assumes that BB=BA, and that the values of BA, NW, and BW satisfy BW=6·BA+NW. This example also assumes that, for each set of experiments, five different pairs of multiplicative gain factors are used for regions <A> and <B> (i.e., k=5 in Equation 16). For example, the first pair of gain factors (i.e., i=1), may be set as $\Delta_{A,1}=1$, $\Delta_{B,1}=1$, and the subsequent experiments (i=2, 3, 4, 5) may use successively increasing values for $\Delta_{A,i}$, and successively decreasing values for $\Delta_{B,i}$, where each pair ($\Delta_{A,i}, \Delta_{B,i}$) maintains a constant total power of the perturbed waveform between experiments.

The first row of FIG. 15 (denoted SET 1) illustrates a first set of five experiments that may be performed with region <A> positioned on the extreme left-hand side of the bandwidth BW, and with region <B> directly adjacent and to the right of region <A>. As described previously, a series of perturbed waveforms (in this case, five) are transmitted, with the power/amplitudes of regions <A> and <B> being adjusted for each perturbed waveform according to the selected pair of gain factors ($\Delta_{A,i}$, $\Delta_{B,i}$) for that waveform. The PSD measurement may be acquired in the notch region <N> of width NW for each of the five perturbed waveforms of SET 1.

The second row of FIG. 15 (denoted SET 2) illustrates a second set of five experiments that may be performed with region <A> still positioned on the extreme left-hand side of the bandwidth BW, but with region <B> now shifted to the right by an amount BB relative to its position in SET 1. Thus, there is now a gap of BB between regions <A> and <B>. Using this new position for region <B>, another series of five perturbed waveforms may be transmitted, with the power/amplitudes of regions <A> and <B> being adjusted for each perturbed waveform according to the selected pair of gain factors ($\Delta_{A,i}$, $\Delta_{B,i}$) for that waveform, as described for SET 1. PSD measurements are acquired in the notch region <N> of width NW for the five perturbed waveforms of SET 2. The position of the notch region <N> remains constant between the five experiments of each set, and also between sets.

Three additional sets of experiments may be performed with region <A> still positioned on the extreme left-hand side, and with region <B> being shifted to the right by the amount BB for each new set, relative to the previous set, until region <B> is positioned on the extreme right-hand side of the bandwidth BW (see SET 5 in the third row, where region <B> is separated from region <A> by an amount 4·BB+NW). The repositioning of region <B> for each new set excludes any coincidence or overlap of region <B> with the notch region <N>.

The fourth row of FIG. 15 (denoted SET 6) illustrates a further set of five experiments that may be performed with region <A> shifted to the right by an amount BA relative to its position in the previous sets, and with region <B> directly adjacent and to the right of region <A>. Using this new position for regions <A> and <B>, another series of five perturbed waveforms may be transmitted, with the power/amplitudes of regions <A> and <B> being adjusted for each perturbed waveform according to the selected pair of gain factors ($\Delta_{A,i}$, $\Delta_{B,i}$) for that waveform, as described previously. PSD measurements are acquired in the notch region <N> of width NW for the five perturbed waveforms of SET 6.

Two additional sets of experiments may be performed with region <A> still shifted by the amount BA relative to the extreme left-hand side, and with region <B> being shifted to the right by the amount BB for each new set, relative to the previous set, until region <B> is positioned on the extreme right-hand side of the bandwidth BW (see SET 8 in the fifth row, where region <B> is separated from region <A> by an amount 3·BB+NW).

In this manner, seven additional sets of five experiments may be performed with different positions of regions <A> and <B>, until region <B> is positioned on the extreme right-hand side of the bandwidth BW and region <A> is positioned adjacent and to the left of region <B> (see SET 15 in the sixth row, where region <A> has been shifted by an amount 4·BA+NW to the right, relative to its initial position in SET 1).

The example of FIG. 15 involves a total of 75 experiments (15 sets; 5 experiments in each set). The ordering of experiments and sets implied by FIG. 15 is merely one example. The 75 experiments may be performed in any other order.

Each set results in a vector $\vec{P}_{RX}$ of length k=5, which may be used to estimate the terms $P_{NLN,(A,A,A)}^{ref}$, $P_{NLN,(A,A,B)}^{ref}$, $P_{NLN,(A,B,B)}^{ref}$, $P_{NLN,(B,B,B)}^{ref}$, and $(P_{ASE}^{ref}+P_{NFTX}^{ref}+P_{NFRX}^{ref})$ in Equation 16. Thus, the series of experiments illustrated in FIG. 15 may result in 15 estimates for each one of the five terms in the vector $\vec{P}^{ref}$. According to some examples, two or more of the estimates of the term representing the sum $(P_{ASE}^{ref}+P_{NFTX}^{ref}+P_{NFRX}^{ref})$ may be averaged together to generate an enhanced (less noisy, potentially more accurate) estimate of $(P_{ASE}^{ref}+P_{NFTX}^{ref}+P_{NFRX}^{ref})$.

Each one of the 15 solutions to Equation 16 produces estimates for the terms $P_{NLN,(A,A,A)}^{ref}$, $P_{NLN,(A,A,B)}^{ref}$, $P_{NLN,(A,B,B)}^{ref}$, and $P_{NLN,(B,B,B)}^{ref}$. In this example, the total nonlinear noise power may be estimated from a sum of (i) the 15 $P_{NLN,(A,A,B)}^{ref}$ estimates; (ii) the 15 $P_{NLN,(A,B,B)}^{ref}$ estimates; (iii) one $P_{NLN,(A,A,A)}^{ref}$ estimate for each location of region <A> (total of 5 locations); and (iv) one $P_{NLN,(A,A,B)}^{ref}$ estimate for region <B> at the extreme right-hand side of the channel, where the estimates of $P_{NLN,(A,A,A)}^{ref}$ and $P_{NLN,(B,B,B)}^{ref}$ may be determined by averaging of duplicate estimates of those terms, thereby improving the SNR of those estimates. Thus $P_{NLN}$ may be estimated from a sum of 36 nonlinear noise terms estimated by solving Equation 16 for 15 sets of experiments.

The examples described with respect to FIGS. 11, 12, 13, 14, and 15 involve perturbed waveforms having a single notch region <N> centered at 0 GHz. However, as described with respect to FIG. 5, a similar series of experiments may be performed using a dual-notch perturbed waveform having two notch regions <–N> and <N> which are symmetrically disposed about the center of the waveform spectrum. Measurements could be obtained over one or both of the notch regions <N> and <–N>.

The technique described above for estimating ASE noise power is applicable to single-channel communication systems. However, a similar series of experiments may be performed to estimate ASE noise power in a multi-channel communication system (e.g., a WDM system) when neighbouring channels are present. In this example, four non-overlapping frequency regions of a perturbed waveform $W_{pert}(f)$ are considered: <A>, <B>, <C>, and <N>, where <N> is a zero-power region, and where <C> is an unperturbed region that coincides with the spectral region of one or more neighbouring channels. The region <C> may be separated from regions <A> and/or <B> by additional zero-power regions.

Under these conditions, $S_{NLN}(f)$ may be expressed using simplified notation as a sum of ten PSD terms according to the following expression:

$$S_{NLN}(f) = S'_{NLN,(A,A,A)}(f) + S'_{NLN,(A,A,B)}(f) + S'_{NLN,(A,B,B)}(f) + S'_{NLN,(B,B,B)}(f) + S'_{NLN,(A,A,C)}(f) + S'_{NLN,(A,C,C)}(f) + S'_{NLN,(B,B,C)}(f) + S'_{NLN,(B,C,C)}(f) + S_{NLN,(A,B,C)}(f) + S_{NLN,(C,C,C)}(f)$$

where $S'_{NLN,(A,A,B)}(f) = S_{NLN,(A,A,B)}(f) + S_{NLN,(A,B,A)}(f) + S_{NLN,(B,A,A)}(f)$ where $S'_{NLN,(A,B,B)}(f) = S_{NLN,(A,B,B)}(f) + S_{NLN,(B,A,B)}(f) + S_{NLN,(B,B,A)}(f)$ where $S'_{NLN,(A,C,C)}(f) = S_{NLN,(A,C,C)}(f) + S_{NLN,(C,A,C)}(f) + S_{NLN,(C,C,A)}(f)$ where $S'_{NLN,(B,B,C)}(f) = S_{NLN,(B,B,C)}(f) + S_{NLN,(B,C,B)}(f) + S_{NLN,(C,B,B)}(f)$ where $S'_{NLN,(B,C,C)}(f) = S_{NLN,(B,C,C)}(f) + S_{NLN,(C,B,C)}(f) + S_{NLN,(C,C,B)}(f)$ [21]

where a generic subscript of format "(X,Y,Z)" denotes that the double integral in Equation 3 is conditioned on $f_1 \in$ region <X>, $f_2 \in$ region <Y>, and $(f_1+f_2-f) \in$ region <Z>. Thus, for example, the term $S_{NLN,(A,B,C)}(f)$ represents the nonlinear noise contribution originating from interactions between the frequency components $f_1$, $f_2$, and $(f_1+f_2-f)$, where $f_1 \in$ region <A>, where $f_2 \in$ region <B>, and where $(f_1+f_2-f) \in$ region <C>. Notably, there are no interactions involving any frequencies within the region <N>, since the perturbed waveform $W_{pert}(f)$ has zero power in that region.

As described previously, the total noise power at the receiver, $P_{RX}$, is the sum $P_{NFTX}$, $P_{NFTX}$, $P_{NLN}$, and $P_{ASE}$ accumulated over the zero-power region <N>. By varying the power in the regions <A> and <B>, while maintaining a constant total power of the waveform, it is possible to vary the total nonlinear noise power $P_{NLN}$, while keeping the values of $P_{NFTX}$, $P_{NFTX}$, and $P_{ASE}$ constant. In a multi-channel system, the portion of the total nonlinear noise power that originates from the three frequencies belonging to the unperturbed region <C>, that is $S_{NLN,(C,C,C)}(f)$, remains constant. In practice, the contribution of $S_{NLN,(C,C,C)}(f)$ to $S_{NLN}(f)$ may be small or negligible for applications with no CD compensation, or applications with CD compensation but high CD coefficients.

Thus, in a multi-channel system, a plurality of measurements may be performed on a respective plurality of perturbed waveforms $W_{pert,i}(f)$, for i=1 . . . k, where k≥10, each perturbed waveform $W_{pert,i}(f)$ having zero power in a region <N>, constant non-zero power in a region <C> that coincides with the spectral region of one or more neighbouring channels, and a different pair of powers in regions <A> and <B>, and where each perturbed waveform $W_{pert,i}(f)$ has the same total waveform power. Using this series of experiments together with estimates of $P_{NFTX}$ and $P_{NFTX}$ measured using a back-to-back communication system, it may be possible to determine an estimate of $P_{ASE}$ in a multi-channel system.

Given a perturbed waveform $W_{pert}(f)$ characterized by a gain of $\Delta_A$ in the region <A> and a gain of $\Delta_B$ in the region <B>, where $\Delta_A$ and $\Delta_B$ are constant multiplicative factors in the linear domain, and where $W_{pert}(f)$ is further characterized by a constant gain of $\Delta_C=1$ (or 0 dB) in the region <C>, the nonlinear noise power over the zero-power region <N> may be expressed as follows:

$$P_{NLN}(\Delta_A, \Delta_B) = \int_{<N>} S_{NLN}(f) df \quad [22]$$

$$= \int_{<N>} \big(S_{NLN,(A,A,A)}(f) + S'_{NLN,(A,A,B)}(f) +$$
$$S'_{NLN,(A,B,B)}(f) + S_{NLN,(B,B,B)}(f) + S'_{NLN,(A,A,C)}(f) + S'_{NLN,(A,C,C)}(f) +$$
$$S'_{NLN,(B,B,C)}(f) + S'_{NLN,(B,C,C)}(f) + S_{NLN,(A,B,C)}(f) + S_{NLN,(C,C,C)}(f)\big) df$$

$$= \int_{<N>} \big(\Delta_A^3 S^{ref}_{NLN,(A,A,A)}(f) + \Delta_A^2 \Delta_B S'^{ref}_{NLN,(A,A,B)}(f) + \Delta_A \Delta_B^2 S'^{ref}_{NLN,(A,B,B)}(f) + \Delta_B^3$$
$$S^{ref}_{NLN,(B,B,B)}(f) + \Delta_A^2 S'^{ref}_{NLN,(A,A,C)}(f) + \Delta_A S'^{ref}_{NLN,(A,C,C)}(f) + \Delta_B^2 S'^{ref}_{NLN,(B,B,C)}(f) +$$
$$\Delta_B S'^{ref}_{NLN,(B,C,C)}(f) + \Delta_A \Delta_B S^{ref}_{NLN,(A,B,C)}(f) + S^{ref}_{NLN,(C,C,C)}(f)\big) df$$

$$= \Delta_A^3 P^{ref}_{NLN,(A,A,A)} + \Delta_A^2 \Delta_B P'^{ref}_{NLN,(A,A,B)} + \Delta_A \Delta_B^2 P'^{ref}_{NLN,(A,B,B)} +$$
$$\Delta_B^3 P^{ref}_{NLN,(B,B,B)} + \Delta_A^2 P'^{ref}_{NLN,(A,A,C)} + \Delta_A P'^{ref}_{NLN,(A,C,C)} +$$
$$\Delta_B^2 P'^{ref}_{NLN,(B,B,C)} + \Delta_B P'^{ref}_{NLN,(B,C,C)} + \Delta_A \Delta_B P'^{ref}_{NLN,(A,B,C)} + P^{ref}_{NLN,(C,C,C)}$$

where the subscript "ref" denotes a reference case wherein $\Delta_A = \Delta_B = 1$.

This experiment may be performed for k independent sets of $\Delta_A$ and $\Delta_B$ terms, that is $(\Delta_{A,i}, \Delta_{B,i})$ for i=1 . . . k, as previously expressed in Equation 15, where k is a positive integer. The range $\Delta_{A,i}$ of may be selected such that it does not intersect the range of $\Delta_{B,i}$.

When combined with the multi-channel derivation in Equation 22, Equation 15 may be expressed in matrix form as follows:

$$\begin{bmatrix} P_{RX,1} \\ P_{RX,2} \\ P_{RX,3} \\ \vdots \\ P_{RX,k} \end{bmatrix} = \begin{bmatrix} \Delta_{A,1}^3 & \Delta_{A,1}^2\Delta_{B,1} & \Delta_{A,1}\Delta_{B,1}^2 & \Delta_{B,1}^3 & \Delta_{A,1}^2 & \Delta_{A,1} & \Delta_{B,1}^2 & \Delta_{B,1} & \Delta_{A,1}\Delta_{B,1} & 1 \\ \Delta_{A,2}^3 & \Delta_{A,2}^2\Delta_{B,2} & \Delta_{A,2}\Delta_{B,2}^2 & \Delta_{B,2}^3 & \Delta_{A,2}^2 & \Delta_{A,2} & \Delta_{B,2}^2 & \Delta_{B,2} & \Delta_{A,2}\Delta_{B,2} & 1 \\ \vdots & \vdots & \vdots & \vdots & \vdots & \vdots & \vdots & \vdots & \vdots & \vdots \\ \Delta_{A,k}^3 & \Delta_{A,k}^2\Delta_{B,k} & \Delta_{A,k}\Delta_{B,k}^2 & \Delta_{B,k}^3 & \Delta_{A,k}^2 & \Delta_{A,k} & \Delta_{B,k}^2 & \Delta_{B,k} & \Delta_{A,k}\Delta_{B,k} & 1 \end{bmatrix} \times \quad [23]$$

$$\begin{bmatrix} P^{ref}_{NLN,(A,A,A)} \\ P^{ref}_{NLN,(A,A,B)} \\ P^{ref}_{NLN,(A,B,B)} \\ P^{ref}_{NLN,(B,B,B)} \\ P^{ref}_{NLN,(A,A,C)} \\ P^{ref}_{NLN,(A,C,C)} \\ P^{ref}_{NLN,(B,B,C)} \\ P^{ref}_{NLN,(B,C,C)} \\ P^{ref}_{NLN,(A,B,C)} \\ P^{ref}_{ASE} + P^{ref}_{NFTX} + P^{ref}_{NFRX} + P^{ref}_{NLN,(C,C,C)} \end{bmatrix}$$

Similarly to the single-channel example, Equation 23 may be expressed using the form of Equation 17. Here, however, $\delta$ denotes a matrix of size k×10, and $\vec{P}^{ref}$ denotes a vector of length 10. $\vec{P}_{RX}$ still denotes a vector of length k. Provided that k≥10, the vector $\vec{P}^{ref}$ can be computed using a Moore-Penrose pseudo inverse expressed in Equation 18. Here, the final term in the vector $\vec{P}^{ref}$ is equal to the sum $(P_{ASE}^{ref} + P_{NFTX}^{ref} + P_{NFRX}^{ref} + P_{NLN,(C,C,C)}^{ref})$. Given estimates of $P_{NFTX}^{ref}$ and $P_{NFRX}^{ref}$, as obtained from an experiment performed on a back-to-back communication system, and assuming an insignificant FWM contribution from only the neighbouring channels, such that $P_{NLN,(C,C,C)}^{ref} \approx 0$, it is possible to infer the value of $P_{ASE}^{ref}$ from the final term in the matrix $\vec{P}^{ref}$.

As described with respect to the single-channel example, if the value of $P_{ASE}^{ref}$ in the multi-channel example is substantially flat over the zero-power region <N>, $S_{ASE}$ and $SNR_{ASE}$ may be calculated according to Equations 19 and 20, respectively.

Figure 16:
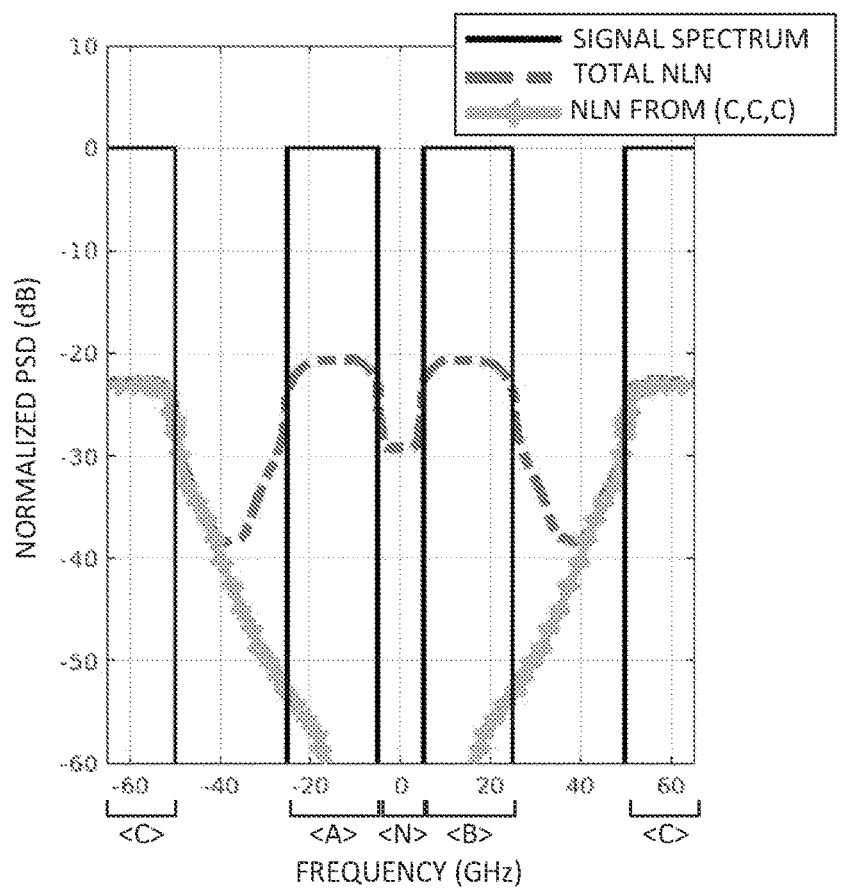
FIGS. 16, 17, and 18 illustrate plots of normalized total nonlinear noise PSD as a function of frequency as determined using split-step simulations of multi-channel propagation of a perturbed waveform over a multi-span optical link.
Figure 17:
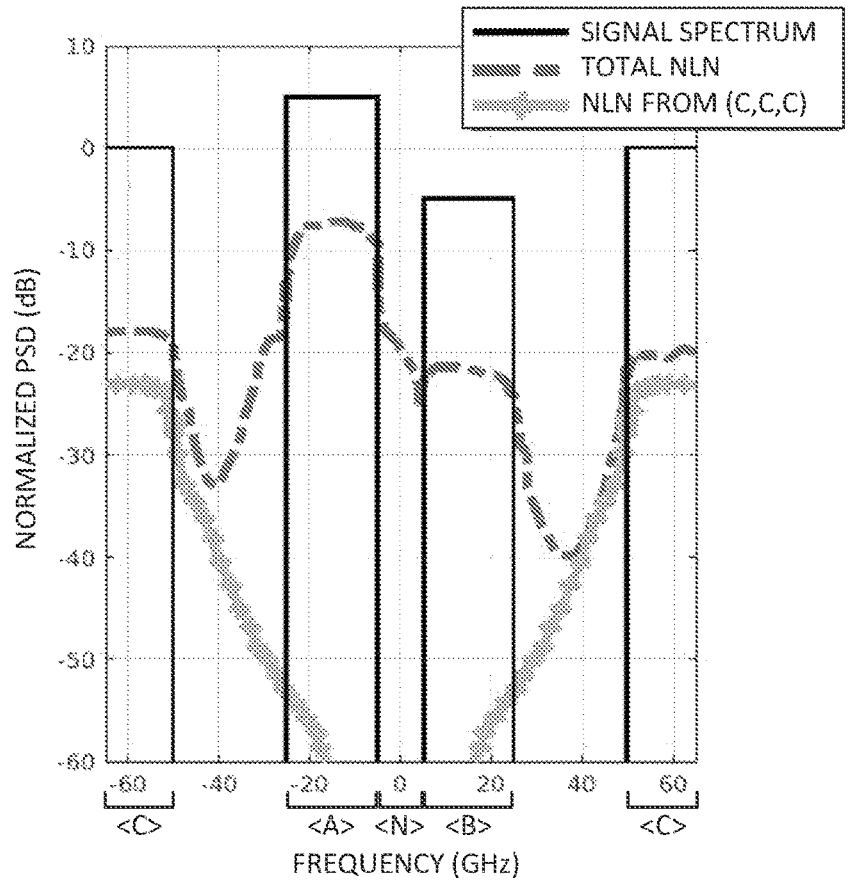
Figure 18:
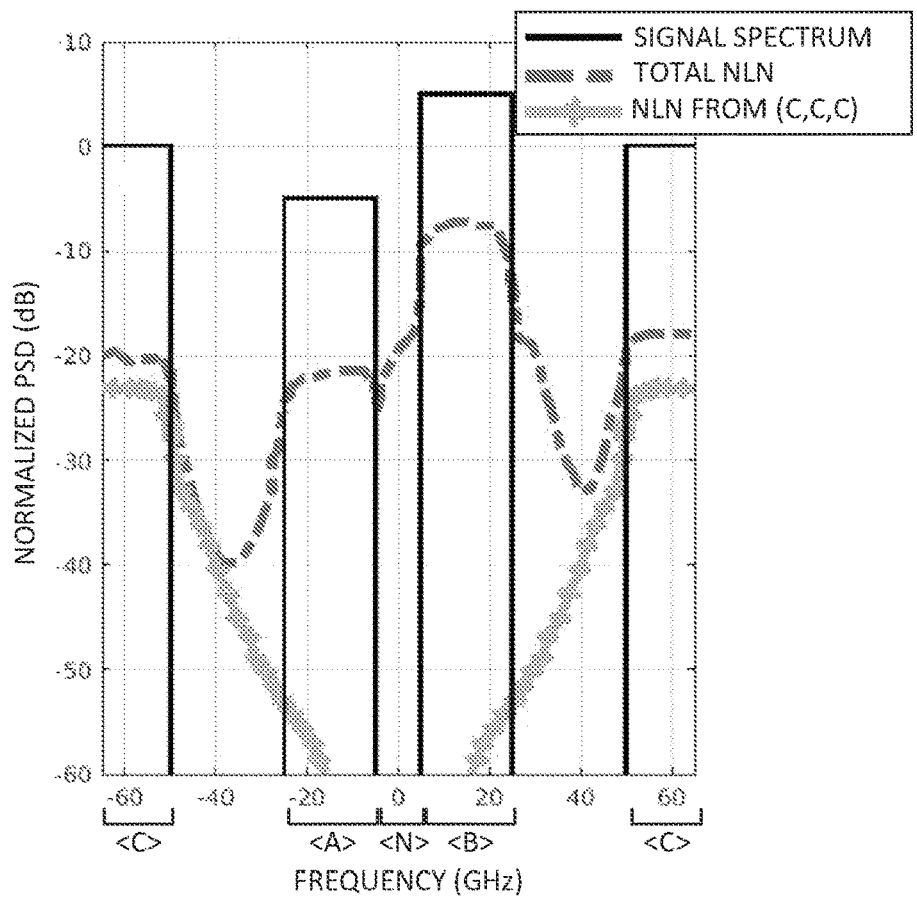

FIGS. 16, 17, and 18 illustrate plots of normalized total nonlinear noise PSD in dB, corresponding to $S_{NLN}(f)$ in Equations 21 and 22, as a function of frequency, f, in GHz as determined using split-step simulations of WDM propagation of a perturbed waveform over an optical link comprising ten spans of a standard single mode fiber (SSMF-28), with a 2-dBm launch power into each span. The plots also include the out-of-band contribution to the nonlinear noise, that is, the nonlinear noise originating from (C,C,C) interactions. The signal spectrum of the perturbed waveform is characterized by a gain of $\Delta_A$ in a region <A> of bandwidth 20 GHz, a gain of $\Delta_B$ in a region <B> of bandwidth 20 GHz, two <C> regions having a constant unperturbed amplitude (i.e., $\Delta_C=0$ dB), and a zero-power region <N> of bandwidth 10 GHz located between the regions <A> and <B>. The channel bandwidth is the combined bandwidth of the regions <A>, <N> and <B>. The region <C> may include all neighbouring channels in the WDM system. The multiplicative gain factors $\Delta_A$ and $\Delta_B$ in FIGS. 16, 17, and 18 are shown in decibels rather than linear units. FIG. 15 16 illustrates the simulation results for the reference case where $\Delta_A=\Delta_B=0$ dB. FIG. 17 illustrates the simulation results for the case where $\Delta_A=+5$ dB and $\Delta_B=-5$ dB. FIG. 18 illustrates the simulation results for the case where $\Delta_A=-5$ dB and $\Delta_B=+5$ dB. The plots in FIGS. 16, 17, and 18 represent examples of three independent experiments that may be used, in addition to seven more experiments (not shown), to generate a vector $\vec{P}_{RX}$ of length k=10 that may be used to calculate $\vec{P}^{ref}$ according to Equation 18 (in the context of Equation 23).

Figure 19:
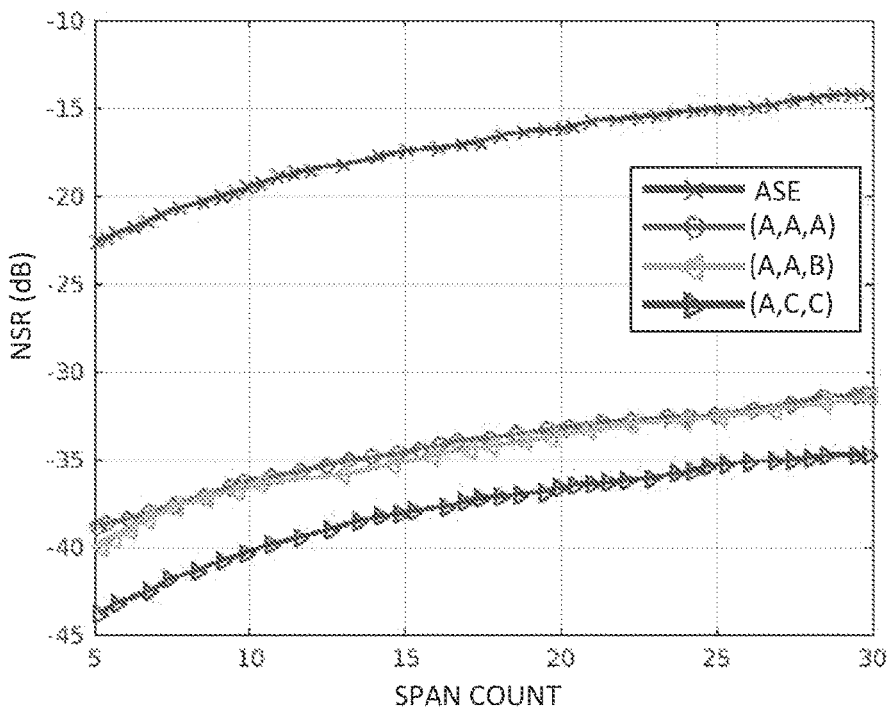
FIG. 19 illustrates a plot of NSR of ASE, two categories of intra-channel nonlinear noise, and inter-channel nonlinear noise as a function of span count as determined using split-step simulations of multi-channel propagation of a perturbed waveform over a multi-span optical link.

FIG. 19 illustrates a plot of NSR in dB for four different noise sources as a function of span count as determined using split-step simulations of WDM propagation of a perturbed waveform over a multi-span optical link, where the noise sources comprise ASE, intra-channel nonlinear noise originating from (A,A,A) interactions, intra-channel nonlinear noise originating from (A,A,B) interactions, and inter-channel noise originating from (A,C,C) interactions. Each span comprises 100 km of SSMF-28 fiber. A signal with a total spectral occupancy of 50 GHz was used, where the notch region <N> was 10 GHz wide, and where the regions <A> and <B> were each 20 GHz wide. The signal was flanked by two neighbouring WDM channels, spaced 75 GHz apart, each having a spectral occupancy of 50 GHz. Estimates of $P_{NFTX}^{ref}$ and $P_{NFRX}^{ref}$ were obtained from a back-to-back experiment, thereby allowing for the inference of $P_{ASE}^{ref}$, as described with respect to Equations 16-18.

As described with respect to FIG. 15, multiple sets of experiments may be performed using perturbed waveforms having regions <A> and <B> in different locations, which may be used to obtain multiple estimates of for each one of the ten terms in the vector $\vec{P}^{ref}$ (in the context of Equation 23). The plurality of estimates for each term may be used to generate an enhanced estimate of $(P_{ASE}^{ref}+P_{NFTX}^{ref}+P_{NFRX}^{ref}+P_{NLN,(C,C,C)}^{ref})$ by averaging, as well as an estimate of the total nonlinear noise power $P_{NLN}$ by summation of the appropriate nonlinear noise terms. In practical implementations, $P_{NLN,(C,C,C)}^{ref}$ may be small enough compared to $(P_{ASE}^{ref}+P_{NFTX}^{ref}+P_{NFRX}^{ref})$ that its contribution to $(P_{ASE}^{ref}+P_{NFTX}^{ref}+P_{NFRX}^{ref}+P_{NLN,(C,C,C)}^{ref})$ may be effectively ignored. For example, given regions <A>, <B>, and <N> as defined in FIG. 15, but with k=10 experiments per set (instead of k=5), then the series of 15 experiments may result in 15 estimates for each one of the ten terms in the vector $\vec{P}^{ref}$. According to some examples, two or more of the estimates of the term representing the sum $(P_{ASE}^{ref}+P_{NFTX}^{ref}+P_{NFRX}^{ref}+P_{NLN,(C,C,C)}^{ref})$ may be averaged together to generate an enhanced (less noisy, potentially more accurate) estimate of $(P_{ASE}^{ref}+P_{NFTX}^{ref}+P_{NFRX}^{ref}+P_{NLN,(C,C,C)}^{ref})$. Furthermore, each one of the 15 solutions to Equation 23 produces estimates for the terms $P_{NLN,(A,A,A)}^{ref}$, $P_{NLN,(A,A,B)}^{ref}$, $P_{NLN,(A,B,B)}^{ref}$, $P_{NLN,(B,B,B)}^{ref}$, $P_{NLN,(A,A,C)}^{ref}$, $P_{NLN,(A,C,C)}^{ref}$, $P_{NLN,(B,B,C)}^{ref}$, $P_{NLN,(B,C,C)}^{ref}$, and $P_{NLN,(A,B,C)}^{ref}$. In this example, the total nonlinear noise power may be estimated from a sum of (i) the 15 $P_{NLN,(A,A,B)}^{ref}$ estimates; (ii) the 15 $P_{NLN,(A,B,B)}^{ref}$ estimates; (iii) the 15 $P_{NLN,(A,B,C)}^{ref}$ estimates; (iv) one $P_{NLN,(A,A,A)}^{ref}$ estimate for each location of region <A> (total of 5 locations); (v) one $P_{NLN,(A,A,C)}^{ref}$ estimate for each location of region <A> (total of 5 locations); (vi) one $P_{NLN,(A,C,C)}^{ref}$ estimate for each location of region <A> (total of 5 locations); (vii) one $P_{NLN,(B,B,B)}^{ref}$ estimate for region <B> at the extreme right-hand side of the channel; (viii) $P_{NLN,(B,B,C)}^{ref}$ estimate for region <B> at the extreme right-hand side of the channel; and (ix) one $P_{NLN,(B,C,C)}^{ref}$ estimate for region <B> at the extreme right-hand side of the channel. The estimates of $P_{NLN,(A,A,A)}^{ref}$, $P_{NLN,(A,A,C)}^{ref}$, $P_{NLN,(A,C,C)}^{ref}$, $P_{NLN,(B,B,B)}^{ref}$, $P_{NLN,(B,B,C)}^{ref}$, and $P_{NLN,(B,C,C)}^{ref}$ may be determined by averaging of duplicate estimates of those terms, thereby improving the SNR of those estimates. Thus $P_{NLN}$ may be estimated from a sum of 64 nonlinear noise terms estimated by solving Equation 23 for 15 sets of experiments.

The examples described with respect to FIGS. 16, 17, 18, and 19 involve a perturbed waveform having a single notch region <N> centered at 0 GHz. However, as described with respect to FIG. 5, a similar series of experiments may be performed using a dual-notch perturbed waveform having two notch regions <–N> and <N> which are symmetrically disposed about the center of the waveform spectrum. According to one example, the sum of the bandwidths of regions <A>, <B>, <N>, and <–N> may be equal to the channel bandwidth. Each of the regions <A> and <B> may be divided into two parts, depending on the positions of the notch regions <N> and <–N>. Measurements could be obtained over one or both of the notch regions <N> and <–N>.

Figure 20:
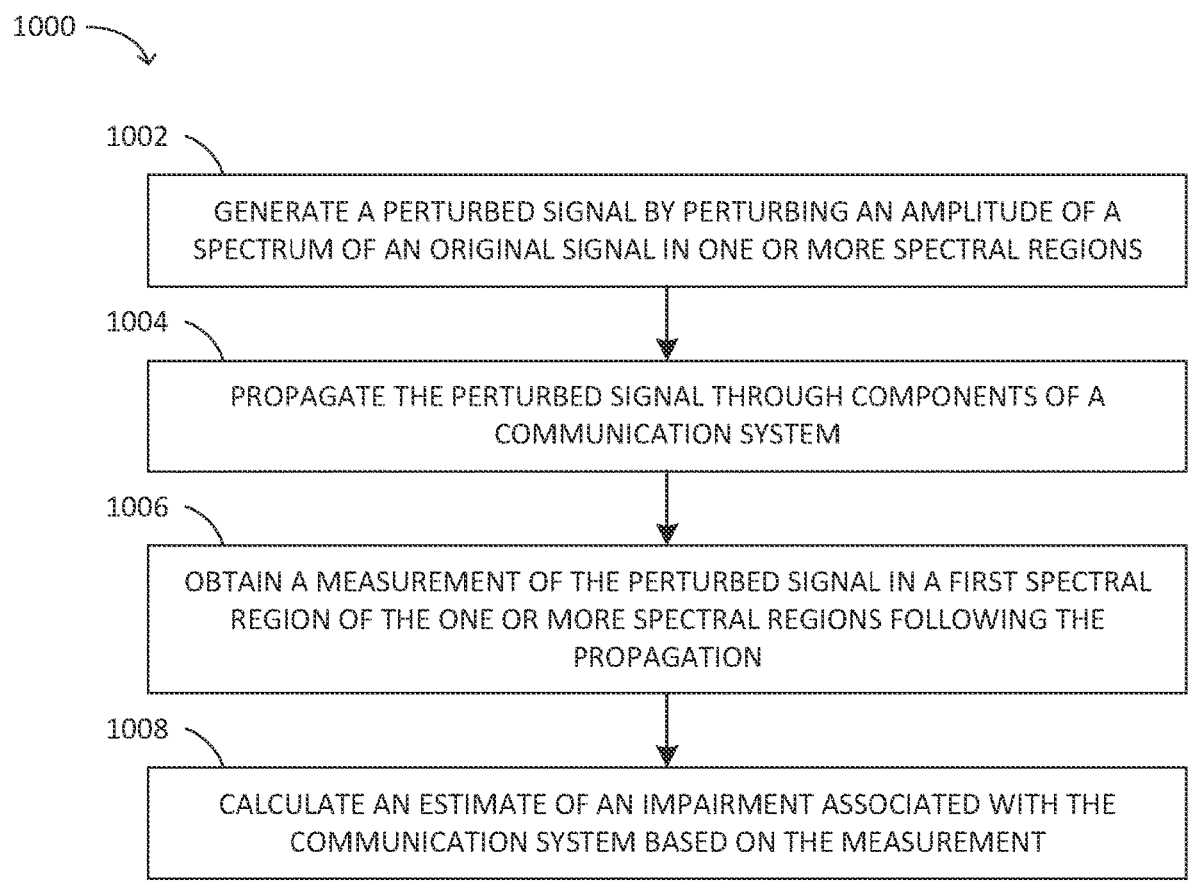
FIG. 20 illustrates a method for estimating impairments in a communication system using spectrally selective signal perturbations in accordance with some examples of the proposed technology.

FIG. 20 illustrates an example method 1000 for estimating impairments in a communication system using spectrally selective signal perturbations. As will be described in more detail below, the method 1000 involves propagating a perturbed signal through one or more components of a communication system. According to some examples, the communication system may comprise a transmitter device, a receiver device, and at least one communication channel that connects the two devices, such as the system shown in FIG. 2. In the case where the communication channel is an electrical channel, the communication system may comprise an electrical wire or cable. In the case where the communication channel is an optical channel, the communication system may comprise an optical link, such as the multi-span link 103 in FIG. 1. According to other examples, the communication system may comprise a back-to-back system, such as the systems shown in FIGS. 4 and 5. According to some examples, the communication system may comprise a SMD, such as an ESA or OSA, or a coherent receiver device acting as a SMD.

At 1002, a perturbed signal is generated by perturbing (or modifying, or adjusting, or increasing/enhancing, or decreasing/attenuating) an amplitude (or power) of a spectrum of an original signal at one or more spectral regions. For example, the signal spectrum illustrated in FIG. 3 or FIG. 4 (left) is an example of a perturbed signal wherein the amplitude/power of the spectrum has been decreased or attenuated to zero at the selected notch region <N> within the spectrum <W> of the original signal. That is, the amplitude of the perturbed signal is substantially zero over a contiguous set of frequencies defining the notch region <N>. In another example, the signal spectrum illustrated in FIG. 5 (left) is an example of a perturbed signal wherein the amplitude of the original signal has been decreased or attenuated to zero at the selected notch regions <−N> and <N> within the spectrum <W> of the original signal. In yet another example, the signal spectra illustrated in FIGS. 11, 12, 13, 15, 16, 17, and 18 are examples of perturbed signals wherein the amplitude/power of the original signal has been decreased or attenuated to zero at the selected notch region <N>. In FIGS. 11 and 16, the amplitude of the original signal remains unperturbed in the regions <A> and <B>; in FIGS. 12 and 17, the amplitude of the original signal is increased or enhanced in region <A> and decreased or attenuated in region <B>; and in FIGS. 13 and 18, the amplitude of the original signal is decreased or attenuated in region <A> and increased or enhanced in region <B>. The spectrally selective increases and decreases in amplitude within regions <A> and <B>, as shown in FIGS. 12, 13, 17, and 18, are examples of spectrally-selective amplitude perturbations.

At 1004, the perturbed signal is propagated through components of a communication system. According to some examples, as described with respect to FIGS. 4 and 5, the components may comprise components of a transmitter device and components of a SMD which is connected directly to the transmitter device (i.e., in a back-to-back configuration). The transmitter device may comprise the circuitry configured to generate the perturbed signal. According to some examples, the SMD may comprise an ESA, an OSA, or a coherent receiver, where the coherent receiver may be configured to act as a SMD. In the case where the SMD is an ESA, the perturbed signal may be propagated through a DAC of the transmitter device, such as one of the DACs 130, 131, 138, 139 in the transmitter 101. In the case where the SMD is an OSA, the perturbed signal may be propagated through electrical and optical components of the transmitter device to the output of the transmitter device, for example, the output of the optical amplifier 144 of the transmitter 101. In the case where the SMD is a coherent receiver, the perturbed signal may be propagated through electrical and optical components of the transmitter device and components of the coherent receiver device up to and including an ADC of the receiver device, such as one of the ADCs 177, 178, 179, 180 in the receiver 105. According to other examples, as described with respect to FIG. 2, the components through which the perturbed signal is propagated may comprise components of a transmitter device, components of a receiver device, and components of at least one communication channel between the transmitter device and the receiver device. In the case of an optical communication system, the components of the communication channel(s) may comprise components of the optical link 103, such as the spans 146 and the optical amplifiers 148. According to some examples, the components of the communication channel(s) may further comprise one or more reconfigurable add-drop multiplexers (ROADMs).

At 1006, a measurement of the perturbed signal is obtained in a first spectral region of the one or more spectral regions following the propagation of the perturbed signal through the components of the communication system 1004. Depending on the communication system being examined and the measurement being made, the measurement may be obtained using a SMD or a coherent receiver. According to some examples, the measurement may comprise a measurement of the power or PSD of the perturbed signal in a spectral region in which the amplitude of the original signal was perturbed by attenuating the original signal to zero power (i.e., a notch region). In the example of FIG. 4, the measurement may comprise a measurement of $S_{SMD}(f)|_{f \in <N>}$, for example. In the example of FIG. 5, the measurement may comprise a measurement of $S_{SMD}(f)|_{f \in <-N>, <N>}$, for example. In the examples of FIGS. 11, 12, 13, 16, 17, and 18, the measurement may comprise a measurement of $S_{RX}(f)|_{f \in <N>}$, for example, or, in the case of a dual-notch perturbed waveform, $S_{RX}(f)|_{f \in <-N>, <N>}$. According to some examples, PSD measurements may be acquired over a subset of the frequencies that satisfy f∈<−N> or f∈<N>. That is, rather than acquired PSD measurements at all frequencies f within the notch regions <−N> and <N>, PSD measurements may be acquired at frequencies satisfying f∈<−M> and/or f∈<M>, where <−M>⊆<−N> and where <M>⊆<N>.

At 1008, an estimate of an impairment associated with the communication system is calculated based on the measurement obtained at 1006. As described with respect to the examples involving the back-to-back communication system, measurements of $S_{SMD}(f)$ within the notch region(s) may be used to estimate a noise floor impairment associated with the communication system. According to some examples, additional versions of the perturbed signal may be generated, each having a notch in a different spectral region of the spectrum of the original signal. The contiguous set of frequencies defining the notch in one version of the perturbed signal may be discrete from the contiguous set of frequencies defining the notch in another version of the perturbed signal. Alternatively, the sets may be partially overlapping, such that the set of frequencies defining the notch in one version includes some of the frequencies in the set of frequencies defining the notch in another version. Each additional version of the perturbed signal may be propagated through the components of the communication system at a different time, and an additional version of the measurement may be obtained for each additional version of the perturbed signal following the propagation. In this manner, it is possible to obtain additional estimates of the noise floor in additional spectral regions.

According to some examples, where the perturbed signal generated at 1002 comprises a notch in a first spectral region, the perturbed signal may also be designed to include notches in one or more additional spectral regions, and the system may be configured to obtain measurements in at least one of the additional spectral regions. In this manner, it is possible obtain multiple estimates of the noise floor in multiple spectral regions based on the propagation of a single perturbed signal.

According to some examples, where the perturbed signal generated at 1002 comprises a notch in a first spectral region (e.g., <−N>), the perturbed signal may also be designed to include a phase perturbation in a second spectral region (<N>) that is substantially symmetrically disposed relative to the first spectral region about a central frequency of the spectrum, where the phase perturbation comprises a function of frequency, as described with respect to Equation 11. For example, the function of frequency may comprise a linear function such as θ(f)=2πfτ$_S$, where τ$_S$ denotes an unknown time delay. The method may further comprise generating additional versions of the perturbed signal, each additional version generated by applying a different phase perturbation, comprising a different function of frequency (for example, using a different value of the time delay τ$_S$ in the function θ(f)=2πfτ$_S$), to the spectrum in the second spectral region, and by attenuating the amplitude of the spectrum to substantially zero over the contiguous set of frequencies defining the first spectral region. Each additional version of the perturbed signal may be propagated through the components of the communication system at a different time. The method may further comprise obtaining an additional version of the power measurement within the first spectral region for each additional version of the perturbed signal following its respective propagation. In such cases, the estimate of the impairment may be calculated based on the additional versions of the power measurement, where the impairment comprises frequency-dependent phase offset, which may then be used to obtain phase corrections. For example, the measured points plotted in FIG. 10 are examples of power measurements obtained from propagating different versions of the perturbed signal with different phase perturbations. According to some examples, based on these measurements, it may be possible to calculate an estimate of the I/Q skew of the communication system in the first spectral region. As described with respect to FIG. 10, the calculation may comprise fitting a smooth curve to the power measurements, and locating the value of the time delay τ$_S$ that corresponds to the minimum power.

As described with respect to the examples involving single-channel and multi-channel (WDM) communication systems, measurements of S$_{RX}$(f) may be acquired for multiple different perturbed signals (each perturbed signal comprising a notch region <N>, and a pair of perturbed regions <A>, <B>, where each pair of perturbed regions has a different pair of amplitudes), and those measurements may be used to estimate ASE, as well as intra-channel nonlinear noise and inter-channel nonlinear noise (in the case of a WDM system). For example, where the perturbed signal generated at 1002 comprises a notch in a first spectral region (e.g., <N>), the perturbed signal may also be designed to have an unperturbed amplitude (relative to the spectrum of the original signal) over a contiguous set of frequencies defining a second spectral region (e.g., <A>), as well as an unperturbed amplitude (relative to the spectrum of the original signal) over a contiguous set of frequencies defining a third spectral region (e.g., <B>). In such examples, the method may further comprise generating additional versions of the perturbed signal, each additional version generated by enhancing the amplitude of the spectrum in the second spectral region (<A>) and by attenuating the amplitude of the spectrum by a corresponding amount in the third spectral region (<B>) to maintain a constant waveform power, wherein each additional version is characterized by a different pair of amplitudes in the second and third spectral regions. The method may further comprise propagating each additional version of the perturbed signal through the components of the communication system at a different time, and obtaining an additional version of the power measurement within the first spectral region for each additional version of the perturbed signal following its respective propagation. In the case of a single-channel system, the P$_{RX,i}$ terms in Equations 16-18 are examples of power measurements obtained from propagating different versions of the perturbed signal with different respective sets of amplitude perturbations (Δ$_A$, Δ$_B$). Based on a sufficient number of these measurements, it may be possible to calculate an estimate of the sum of the ASE and the combined noise floor of the transmitter and receiver in the first spectral region, and/or an estimate of intra-channel nonlinear noise of the communication system in the first spectral region. As described with respect to Equation 18, the calculation may comprise using a Moore-Penrose pseudo inverse on k power measurements, where k≥5. According to some examples, the ASE may be separated or distinguished from the combined noise floor using a separate back-to-back experiment to generate an estimate of the noise floor. As described with respect to FIG. 15, additional sets of experiments may be performed with the regions <A> and <B> being positioned in different locations. By solving Equation 16 for these additional sets, it may be possible to obtain an improved estimate of the sum of the ASE and the combined noise floor. It may also be possible to obtain an estimate of total nonlinear noise power. In the case of a multi-channel system (e.g., where the perturbed signal and each additional version of the perturbed signal are propagated over a first WDM channel which experiences crosstalk from a second WDM channel), the P$_{RX,i}$ terms in Equation 23 are examples of power measurements obtained from propagating different versions of the perturbed signal with different respective sets of amplitude perturbations (Δ$_A$, Δ$_B$). Based on a sufficient number of these measurements, it may be possible to calculate an estimate of inter-channel nonlinear noise contributed by the second WDM to the first WDM channel. The calculation may comprise using a Moore-Penrose pseudo inverse on k power measurements, where k≥10.

Although the examples described herein generally relate to optical communication systems, and particularly to fiber-optic communications, it should be understood that the proposed technology may also be applied to free space optical communications, as well as non-optical communication systems, such as wired and wireless systems.

Figure 21:
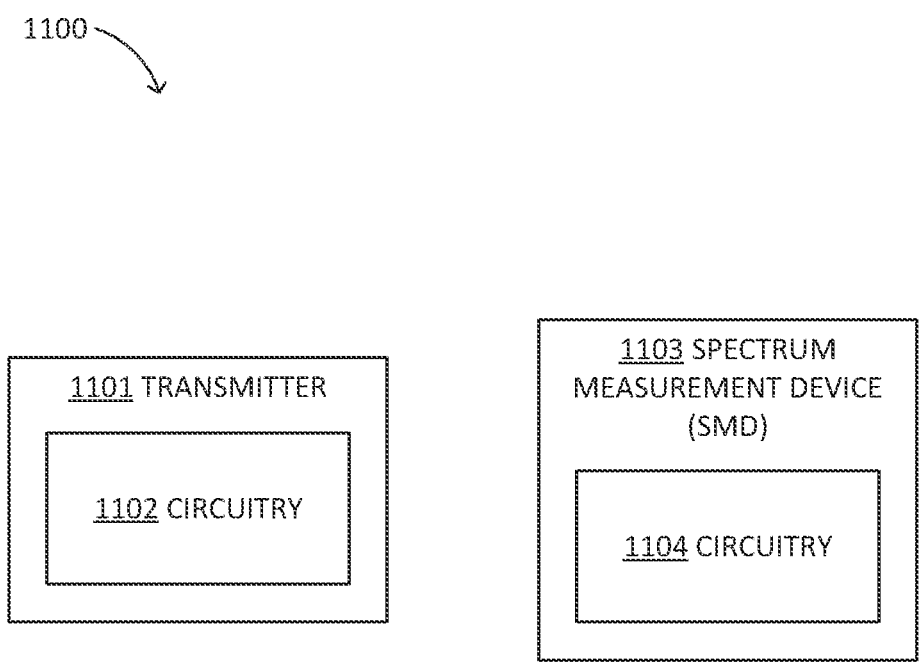
FIG. 21 illustrates an example communication system.

FIG. 21 illustrates an example communication system 1100 comprising circuitry configured to implement the method 1000. The communication system comprises at least a transmitter 1101 and a SMD 1103. According to some examples, the transmitter 1101 comprises an optical transmitter such as the transmitter 101, and the SMD 1103 comprises a coherent optical receiver such as the receiver 105. According to some examples, the SMD 1103 comprises an OSA or an ESA. The transmitter 1101 and the SMD 1103 comprise respective circuitry 1102 and 1104 configured to implement various steps of the method 1000. For example, the circuitry 1102 may be configured to implement steps 1002 and 1004, while the circuitry 1104 may be configured to implement steps 1006 and 1008. The circuitry 1102 and 1104 may comprise hardware, firmware, software, or a combination thereof. In some examples, the circuitry 1102 and/or 1104 comprises at least one non-transitory computer-readable medium storing computer-executable instructions which, when executed by one or more processors of the transmitter 1101 and/or the SMD 1103, results in the various steps of the method 1000.

The scope of the claims should not be limited by the details set forth in the examples, but should be given the broadest interpretation consistent with the description as a whole.

What is claimed is:
1. An optical communication system comprising:
    circuitry configured to generate a perturbed signal by
        perturbing an amplitude of a spectrum of an original signal in multiple spectral regions, wherein the perturbed signal has a same total power as the original signal;

circuitry configured to propagate the perturbed signal through components of the optical communication system;

circuitry configured to obtain a measurement of the perturbed signal in a first spectral region of the multiple spectral regions following the propagation of the perturbed signal; and circuitry configured to calculate an estimate of an impairment associated with the optical communication system based on the measurement.

2. The optical communication system as claimed in claim 1, wherein the components comprise components of a transmitter device and components of a spectrum measurement device (SMD) connected directly to the transmitter device, the transmitter device comprising the circuitry configured to generate the perturbed signal, and the SMD comprising the circuitry configured to obtain the measurement, wherein the amplitude of the spectrum is attenuated to substantially zero over a contiguous set of frequencies defining the first spectral region, wherein the measurement comprises a measurement of power of the perturbed signal in the first spectral region, and wherein the impairment comprises a noise floor of the optical communication system in the first spectral region.

3. The optical communication system as claimed in claim 2, further comprising circuitry configured to generate additional versions of the perturbed signal, each additional version generated by attenuating the amplitude of the spectrum to substantially zero over a different contiguous set of frequencies defining a different spectral region of the spectrum;

circuitry configured to propagate each additional version of the perturbed signal through the components of the optical communication system at a different time;

circuitry configured to obtain an additional version of the measurement for each additional version of the perturbed signal following the propagation of the additional version; and circuitry configured to calculate an additional estimate of the noise floor in each additional spectral region based on each additional version of the measurement.

4. The optical communication system as claimed in claim 2, wherein the amplitude of the spectrum is attenuated to substantially zero over a contiguous set of frequencies defining a second spectral region of the multiple spectral regions, the communication system further comprising circuitry configured to obtain a measurement of power of the perturbed signal in the second spectral region following the propagation of the perturbed signal; and circuitry configured to calculate an estimate of a noise floor of the communication system in the second spectral region based on the measurement of the perturbed signal in the second spectral region.

5. The optical communication system as claimed in claim 2, wherein the SMD comprises an optical spectrum analyzer or a coherent receiver.

6. The optical communication system as claimed in claim 1, wherein the amplitude of the spectrum is attenuated to substantially zero over a contiguous set of frequencies defining the first spectral region, the optical communication system further comprising circuitry configured to generate the perturbed signal by applying a phase perturbation to the spectrum in a second spectral region that is substantially symmetrically disposed relative to the first spectral region about a central frequency of the spectrum, wherein the phase perturbation comprises a function of frequency;

circuitry configured to generate additional versions of the perturbed signal, each additional version generated by applying a different phase perturbation, comprising a different function of frequency, to the spectrum in the second spectral region, and by attenuating the amplitude of the spectrum to substantially zero over the contiguous set of frequencies defining the first spectral region;

circuitry configured to propagate each additional version of the perturbed signal through the components of the optical communication system at a different time; and circuitry configured to obtain an additional version of the measurement in the first spectral region for each additional version of the perturbed signal following the propagation of the additional version of the perturbed signal, wherein the estimate of the impairment is calculated based on the additional versions of the measurement, and wherein the impairment comprises frequency-dependent phase offset.

7. The optical communication system as claimed in claim 1, wherein the components comprise components of a transmitter device, components of a receiver device, and components of at least one optical communication channel between the transmitter device and the receiver device, the transmitter device comprising the circuitry configured to generate the perturbed signal, and the receiver device comprising the circuitry configured to obtain the measurement, and wherein an amplitude of the spectrum is attenuated to substantially zero over a contiguous set of frequencies defining the first spectral region, wherein the amplitude is unperturbed over a contiguous set of frequencies defining a second spectral region, and wherein the amplitude is unperturbed over a contiguous set of frequencies defining a third spectral region, the optical communication system further comprising circuitry configured to generate additional versions of the perturbed signal, each additional version generated by enhancing the amplitude of the spectrum in the second spectral region and by attenuating the amplitude of the spectrum by a corresponding amount in the third spectral region, wherein each additional version is characterized by a different pair of amplitudes in the second and third spectral regions;

circuitry configured to propagate each additional version of the perturbed signal through the components of the optical communication system at a different time;

circuitry configured to obtain an additional version of the measurement for each additional version of the perturbed signal following the propagation of the additional version; and circuitry configured to calculate the estimate of impairment based on the measurement and the additional versions of the measurement.

8. The optical communication system as claimed in claim 7, wherein the optical communication system is configured for optical communication and wherein the components of the at least one optical communication channel comprise a plurality of spans, each span comprising an optical amplifier.

9. The optical communication system as claimed in claim 7, wherein the impairment comprises amplified spontaneous emission (ASE) or intra-channel nonlinear noise or both.

10. The optical communication system as claimed in claim 7, wherein the at least one optical communication channel comprises first and second wavelength division multiplexing (WDM) channels, wherein the perturbed signal and each additional version of the perturbed signal are propagated over the first WDM channel, and wherein the impairment comprises inter-channel nonlinear noise contributed by the second WDM channel to the first WDM channel.

11. A method comprising:
generating a perturbed signal by perturbing an amplitude of a spectrum of an original signal in multiple spectral regions, wherein the perturbed signal has a same total power as the original signal;
propagating the perturbed signal through components of an optical communication system;
obtaining a measurement of the perturbed signal in a first spectral region of the multiple spectral regions following the propagation of the perturbed signal; and
calculating an estimate of an impairment associated with the optical communication system based on the measurement.

12. The method as claimed in claim 11,
wherein the components comprise components of a transmitter device and components of a spectrum measurement device (SMD) connected directly to the transmitter device, the transmitter device configured to generate the perturbed signal, and the SMD configured to obtain the measurement,
wherein the amplitude of the spectrum is attenuated to substantially zero over a contiguous set of frequencies defining the first spectral region,
wherein the measurement comprises a measurement of power of the perturbed signal in the first spectral region, and
wherein the impairment comprises a noise floor of the optical communication system in the first spectral region.

13. The method as claimed in claim 12, further comprising
generating additional versions of the perturbed signal, each additional version generated by attenuating the amplitude of the spectrum to substantially zero over a different contiguous set of frequencies defining a different spectral region of the spectrum;
propagating each additional version of the perturbed signal through the components of the optical communication system at a different time;
obtaining an additional version of the measurement for each additional version of the perturbed signal following the propagation of the additional version; and
calculating an additional estimate of the noise floor in each additional spectral region based on each additional version of the measurement.

14. The method as claimed in claim 12, wherein the amplitude of the spectrum is attenuated to substantially zero over a contiguous set of frequencies defining a second spectral region of the multiple spectral regions, the method further comprising
obtaining a measurement of power of the perturbed signal in the second spectral region following the propagation of the perturbed signal; and
calculating an estimate of a noise floor of the optical communication system in the second spectral region based on the measurement of the perturbed signal in the second spectral region.

15. The method as claimed in claim 12, wherein the SMD comprises an optical spectrum analyzer or a coherent receiver.

16. The method as claimed in claim 11, wherein the amplitude of the spectrum is attenuated to substantially zero over a contiguous set of frequencies defining the first spectral region, the method further comprising
generating the perturbed signal by applying a phase perturbation to the spectrum in a second spectral region that is substantially symmetrically disposed relative to the first spectral region about a central frequency of the spectrum, wherein the phase perturbation comprises a function of frequency;
generating additional versions of the perturbed signal, each additional version generated by applying a different phase perturbation, comprising a different function of frequency, to the spectrum in the second spectral region, and by attenuating the amplitude of the spectrum to substantially zero over the contiguous set of frequencies defining the first spectral region;
propagating each additional version of the perturbed signal through the components of the optical communication system at a different time; and
obtaining an additional version of the measurement in the first spectral region for each additional version of the perturbed signal following the propagation of the additional version of the perturbed signal,
wherein the estimate of the impairment is calculated based on the additional versions of the measurement, and wherein the impairment comprises frequency-dependent phase offset.

17. The method as claimed in claim 11,
wherein the components comprise components of a transmitter device, components of a receiver device, and components of at least one optical communication channel between the transmitter device and the receiver device, the transmitter device configured to generate the perturbed signal, and the receiver device configured to obtain the measurement, and
wherein an amplitude of the spectrum is attenuated to substantially zero over a contiguous set of frequencies defining the first spectral region, wherein the amplitude is unperturbed over a contiguous set of frequencies defining a second spectral region, and wherein the amplitude is unperturbed over a contiguous set of frequencies defining a third spectral region,
the method further comprising
generating additional versions of the perturbed signal, each additional version generated by enhancing the amplitude of the spectrum in the second spectral region and by attenuating the amplitude of the spectrum by a corresponding amount in the third spectral region, wherein each additional version is characterized by a different pair of amplitudes in the second and third spectral regions;
propagating each additional version of the perturbed signal through the components of the optical communication system at a different time;

obtaining an additional version of the measurement for each additional version of the perturbed signal following the propagation of the additional version; and calculating the estimate of impairment based on the measurement and the additional versions of the measurement.

18. The method as claimed in claim 17, wherein the components of the at least one optical communication channel comprise a plurality of spans, each span comprising an optical amplifier.

19. The method as claimed in claim 17, wherein the impairment comprises amplified spontaneous emission (ASE) or intra-channel nonlinear noise or both.

20. The method as claimed in claim 17, wherein the at least one optical communication channel comprises first and second wavelength division multiplexing (WDM) channels, wherein the perturbed signal and each additional version of the perturbed signal are propagated over the first WDM channel, and wherein the impairment comprises inter-channel nonlinear noise contributed by the second WDM channel to the first WDM channel.

* * * * *